(12) United States Patent
Joye

(10) Patent No.: US 11,991,266 B2
(45) Date of Patent: May 21, 2024

(54) FULLY HOMOMORPHIC CRYPTOGRAPHY WITH IMPROVED DATA ITEM REPRESENTATION

(71) Applicant: ZAMA SAS, Paris (FR)

(72) Inventor: Marc Joye, Saint Zacharie (FR)

(73) Assignee: ZAMA SAS, Paris (FR)

( * ) Notice: Subject to any disclaimer, the term of this patent is extended or adjusted under 35 U.S.C. 154(b) by 0 days.

(21) Appl. No.: 18/250,809

(22) PCT Filed: Oct. 28, 2021

(86) PCT No.: PCT/EP2021/080017
§ 371 (c)(1),
(2) Date: Apr. 27, 2023

(87) PCT Pub. No.: WO2022/090407
PCT Pub. Date: May 5, 2022

(65) Prior Publication Data
US 2023/0396409 A1 Dec. 7, 2023

(30) Foreign Application Priority Data
Oct. 29, 2020 (EP) .................................... 20290073

(51) Int. Cl.
*H04L 9/00* (2022.01)
*G06N 3/048* (2023.01)

(52) U.S. Cl.
CPC ............ *H04L 9/008* (2013.01); *G06N 3/048* (2023.01)

(58) Field of Classification Search
CPC ................................ H04L 9/008; G06N 3/048
See application file for complete search history.

(56) References Cited

U.S. PATENT DOCUMENTS

| 2014/0270159 | A1* | 9/2014 | Youn | ................... | H04L 9/0861 |
| | | | | | 380/44 |
| 2017/0134157 | A1 | 5/2017 | Laine et al. | | |
| 2017/0180115 | A1 | 6/2017 | Laine et al. | | |
| 2018/0375640 | A1* | 12/2018 | Laine | ................... | H04L 9/008 |
| 2019/0007196 | A1 | 1/2019 | Malluhi et al. | | |
| 2019/0394019 | A1* | 12/2019 | Gao | ................... | H04L 9/008 |

(Continued)

FOREIGN PATENT DOCUMENTS

| CN | 108718231 | 10/2018 |
| CN | 111510281 | 8/2020 |
| JP | 2014-102398 | 6/2014 |

OTHER PUBLICATIONS

Alperin-Sheriff, Jacob et al, *Faster Bootstrapping with Polynomial Error*, Cryptology ePrint Archive, Paper 2017/094, Jun. 13, 2014.

(Continued)

*Primary Examiner* — Meng Li
(74) *Attorney, Agent, or Firm* — NIXON & VANDERHYE P.C.

(57) ABSTRACT

Some embodiments are directed to a fully homomorphic encryption (FHE) cryptography, wherein some encrypted data items are clipped, thereby reducing a bit-size of the encrypted data item and increasing an associated noise level of the encrypted data item. An FHE operation or a decrypt operation that operates on the clipped encrypted data item as input, has noise tolerance above a noise level associated with the clipped encrypted data item.

23 Claims, 7 Drawing Sheets

(56) References Cited

U.S. PATENT DOCUMENTS

| | | | | |
|---|---|---|---|---|
| 2019/0394039 | A1* | 12/2019 | Higo | H04L 9/0894 |
| 2020/0266974 | A1 | 8/2020 | Cheon et al. | |
| 2020/0358611 | A1* | 11/2020 | Hoang | H04L 9/3231 |
| 2020/0382273 | A1* | 12/2020 | Vald | G06N 5/01 |
| 2020/0403781 | A1* | 12/2020 | Gentry | H04N 21/2353 |
| 2021/0152328 | A1* | 5/2021 | Enga | H04L 9/14 |
| 2022/0029783 | A1* | 1/2022 | Cheon | G06F 17/16 |

OTHER PUBLICATIONS

Gentry, Craig, *Fully Homomorphic Encryption Using Ideal Lattices*, STOC'09, May 31-Jun. 2, 2009.

Brakerski, Zvika et al; *Efficient Homomorphic Encryption from (Standard) LWE*, Cryptology ePrint Archive, Paper 2011/344 (2011).

Gentry, Craig et al, *Homomorphic Encryption from Learning with Errors: Conceptually-Simpler, Asymptotically-Faster, Attribute-Based*, Cryptology ePrint Archive, Paper 2013/340, Jun. 8, 2013.

Chillotti et al, *Faster Fully Homomorphic Encryption: Bootstrapping in less than 0.1 Seconds*, Cryptology ePrint Archive, Paper 2016/870 (2016).

Chillotti et al, *TFHE: Fast Fully Homomorphic Encryption over the Torus*, Cryptology ePrint Archive, Paper 2018/421 (2018).

Rothblum, Ron, *Homomorphic Encryption: from Private-Key to Public-Key*, Electronic Colloquium on Computational Complexity, Report No. 146 (2010).

Boura et al., High-Precision Privacy-Preserving Real-Valued Function Evaluation, Retrieved from the Internet: URL:/1234.pdf[retrieved on Dec. 22, 2017] section 3.3, Dec. 22, 2017, pp. 1-26, vol. 2017122:210415, IACR, Internàttonàl Association E.or Cryptoi.ogic Research.

Chen Hao et al., Simple Encrypted Arithmetic Library-Seal v2.1, Retrieved from the Internet:URL:https://www.microsoft.com/en-us/research/wp-content/uploads/2016/09/sealmanual-2 .Pdf, Sep. 30, 2016, pp. 1-27.

Cheon Jung Hee et al., An Approach to Reduce Storage for Homomorphic Computations, IACR| Internationàl Association E'or Cryptoi,ogic Reseàrch,, Oct. 31, 2013, pp. 1-22, vol. 20131103:172321.

International Search Report and Written Opinion of the ISA for PCT/EP2021/080017 dated Feb. 7, 2022, 10 pages.

First Office Action, CN Application No. 2021800793285, dated Sep. 21, 2023.

Notice of Rejection, JP Application No. 2023-539746, dated Oct. 3, 2023.

* cited by examiner

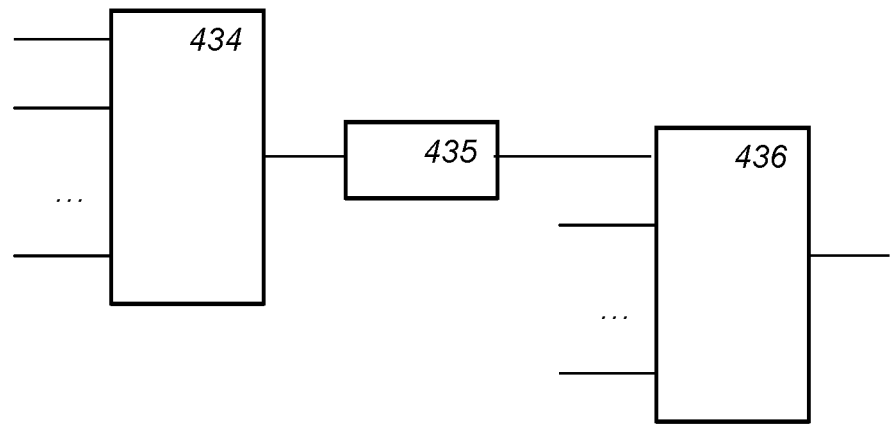
Fig. 4c
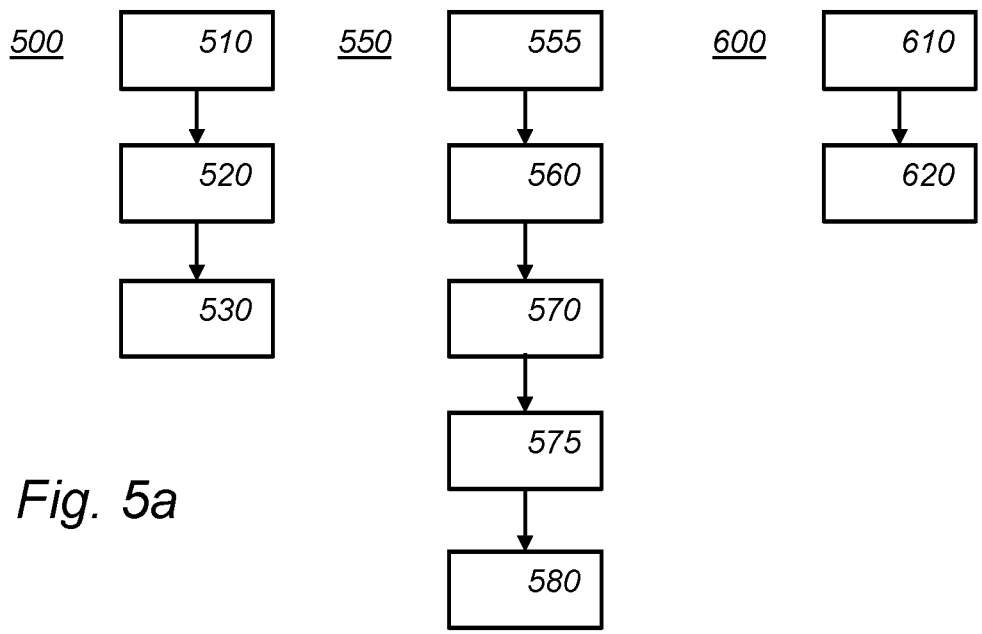
Fig. 5a
Fig. 5b
Fig. 5c

FULLY HOMOMORPHIC CRYPTOGRAPHY WITH IMPROVED DATA ITEM REPRESENTATION

This application is the U.S. national phase of International Application No. PCT/EP2021/080017 filed Oct. 28, 2021, which designated the U.S. and claims priority to EP Patent Application No. 20290073.4 filed Oct. 29, 2020, the entire contents of each of which are hereby incorporated by reference.

FIELD

The presently disclosed subject matter relates to a method for performing a computation using fully homomorphic encryption cryptography, a method for configuring a set of FHE operations implementing a computation, a method for reducing the size of encrypted data items for use in a computation using fully homomorphic encryption cryptography, a system for performing a computation using fully homomorphic encryption cryptography, a system for configuring a set of FHE operations implementing a computation, a system for reducing the size of encrypted data items, a computer readable medium.

BACKGROUND

Ever since Craig Gentry's break-through paper "Fully Homomorphic Encryption Using Ideal Lattices" (Full version in *Commun. ACM* 53(3):97-105, 2010), there has been a continued effort to make Fully Homomorphic Encryption (FHE) sufficiently efficient for real-world application. An FHE allows one to perform computations, e.g., evaluate circuits, over encrypted data without being able to decrypt. For example, input data and computation result may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and out-sourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease or other disorder. Using homomorphic encryption the medical model may be applied to medical data that is received in encrypted form. This means that the party that offers the medical model does not have access to the plain medical data that corresponds to the encrypted medical data. The user of the service can decrypt the result of the medical model application.

A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

A cryptosystem that supports arbitrary computations on ciphertexts is known as fully homomorphic encryption (FHE). Such a scheme enables the evaluation of a wide range of functions, and which can be run on encrypted inputs to produce an encryption of the result. For example, so-called functional completeness can be obtained once a combination of and-gates and or-gates are available as this allows one to implement any Boolean circuit. Such can be run by an untrusted party without revealing its inputs and internal state. A fully homomorphic encryption may be leveled, in which case the number of certain operations cannot exceed a predetermined threshold. A leveled fully homomorphic scheme may be converted to an unleveled FHE scheme by performing bootstrap operations. A bootstrap operation increases the number of operations than can be performed on an encrypted data item.

A fully homomorphic encryption may support computations expressed in some special form, e.g., as a Boolean or arithmetic circuit. For example, a leveled fully homomorphic encryption may support the evaluation of arbitrary circuits but of a bounded, pre-determined, depth. Unleveled fully homomorphic encryption (FHE) allows the evaluation of arbitrary circuits of unbounded depth. A leveled FHE scheme may be converted to unleveled FHE by periodic execution of a bootstrap operation on data. It is known how to compile a computation, e.g., a function, in the form of a circuit.

Since Gentry's paper many FHE schemes have been developed, bringing computation times down with multiple orders of magnitude. Now, many FHE schemes are known. A more recent example of an FHE scheme is described in the paper "TFHE: Fast Fully Homomorphic Encryption over the Torus" by Ilaria Chillotti, et al. (J. Cryptology 33(1):34-91, 2020). Nevertheless, there remains a need to further improve the efficiency of FHE schemes.

SUMMARY

It would be advantageous to have improved FHE cryptography. Current systems suffer from high latency, high storage needs, and so on. A method for performing a computation using fully homomorphic encryption cryptography provided addressing these and/or other concerns. A clipping operation is introduced; by clipping an FHE encrypted data item, a bit-size of the encrypted data item is reduced. This increases the associated noise level of the encrypted data item, but this is kept below a noise tolerance of a following FHE operation or decrypt operation. This advantageously reduces the size of encrypted data items, without impacting security. As modern FHE schemes can have a relatively high noise threshold, it frequently happens that clipping can be performed. In fact, the noise level is typically selected as a system parameter that can be set to a chosen threshold depending on the other FHE parameters so that the overall security meets an expected level. Interestingly, the clipping operation also allows one to define a set of FHE parameters that would otherwise leads to an insecure instantiation. For example, one may clip a secure encryption to shorter values and keep a secure system, whereas encryption without clipping having the same lengths as the clipped items may be insecure. A further example is discussed herein.

Experiments have shown that encrypted data items can be about reduced by half, and sometimes even more, yet with only modest noise increase. Accordingly, the efficiency of the system improves. Using the clipping operation, latency can be reduced by a significant amount.

For example, storing a clipped encrypted data item needs less storage space. For example, transmitting a clipped encrypted data item has lower latency. This enables distributed computing. For example, computing on a clipped encrypted data item requires fewer computer instructions, gates, or the like, as the input is smaller. Clipping does not impair security, on the contrary, by inserting clipping operation more of the computation is done at a higher noise level, which is a disadvantage for attacking the system.

For example, a first operation on a first computing device may produce a first encrypted output, while a second operation on a second computing device needs the first encrypted output as an input. The first encrypted data item can be clipped at the first device before transmitting it to the second device to reduce latency. Especially, if the second operation is a bootstrap operation, or comprises a bootstrap operation, or is a decrypt operation than relatively much of the encrypted data item can be clipped.

In an embodiment, an encrypted data item, in particular a clipped data item may be represented as a tuple of values in signed-digit representation.

An aspect of the invention is configuring a set of FHE operations to include clipping operations. An aspect of the invention is reducing the size of stored encrypted data items. An aspect of the invention is a system for performing a computation, a configuration and/or a size reduction. These systems are an electronic system or device. For example, these systems may be configured to receive input over a computer network.

An aspect is computer program code, e.g., software, configured to perform a computation, a configuration and/or a size reduction, when the computer program code is executed on a computer. An aspect of the invention is a computer readable medium comprising the computer program code. An aspect of the invention is a computer readable medium comprising a computation implemented in FHE operations comprising one or more clipping operations, e.g., obtained from the configuring method.

Embodiments may be applied in a wide range of applications, e.g., neural networks, e.g., image classifiers, e.g., medical image classifiers, e.g., control systems, e.g., privacy preserving computations, etc.

A method according to an embodiment may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium. Another aspect of the presently disclosed subject matter is a method of making the computer program available for downloading.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a system for performing a computation using fully homomorphic encryption (FHE), FIG. 1b schematically shows an example of an embodiment of a system for performing a computation using FHE, FIG. 1c schematically shows an example of an embodiment of a system for performing a computation using FHE, FIG. 1d schematically shows an example of an embodiment of a system for performing a computation using FHE, FIG. 1e schematically shows an example of an embodiment of a system for performing a computation using FHE, FIG. 2 schematically shows an example of an embodiment of a system for performing a computation using FHE, FIGS. 3a-3d schematically show examples of an embodiment of clipping and one or more FHE operations, FIG. 4a schematically shows an example of an embodiment of a system for performing a neural network computation using FHE, FIG. 4b schematically shows an example of an embodiment of a system for performing a neural network computation using FHE, FIG. 4c schematically shows an example of an embodiment of a computing of a multi-sum using FHE, FIG. 5a schematically shows an example of an embodiment of a method for performing a computation using FHE, FIG. 5b schematically shows an example of an embodiment of a method for configuring a set of FHE operations implementing a computation, FIG. 5c schematically shows an example of an embodiment of a method for reducing the size of encrypted data items for use in a computation using fully homomorphic encryption (FHE) cryptography, FIG. 6a schematically shows a computer readable medium having a writable part comprising a computer program according to an embodiment, FIG. 6b schematically shows a representation of a processor system according to an embodiment.

Figure 1A:
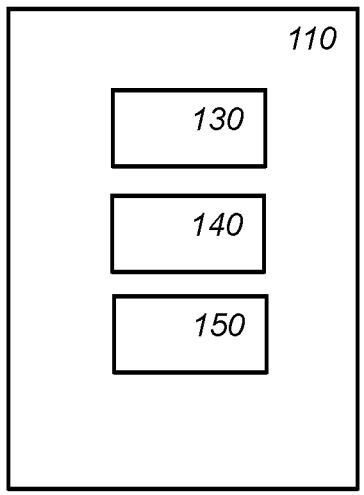

LIST OF REFERENCE NUMERALS IN FIGS.
1a-4c, 6a, 6b

The following list of references and abbreviations is provided for facilitating the interpretation of the drawings and shall not be construed as limiting the claims.

110 an FHE computing system
111-115 an FHE computing system
130 a processor system
140 a storage
141 a storage
150 a communication interface
160 a data-provider system
161 encrypted data items
170 a data size-reduction system
180 an FHE configuring system
181 a computation representation
200 an FHE system
210 multiple encrypted data items
211-212 an encrypted data item
220 a pool of multiple encrypted data items
221-223 an encrypted data item
230 a computing network,
231-234 an FHE operation 240 an encryption component
241 an encryption key
250 a decryption component
321-323 an encrypted data item
331-333 an FHE operation
341-342 a clipping operation
351-352 a bootstrap operation
361 a transfer
401 a first FHE device
402 a second FHE device
431 an FHE multi-sum operation
432, 433 a combined FHE bootstrap and activation-function operation
434, 436 an FHE multi-sum operation
435 a bootstrap operation,
441 a clipping operation
461 a transfer
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of an FHE computing system 110, e.g., a system for performing a computation using fully homomorphic encryption (FHE) cryptography. For example, the system 110 of FIG. 1a may be used to perform a computation on data, even though said data is received in encrypted from, e.g., from a data-provider. The system shown in FIG. 1a may in addition, or instead, be configured as a system for configuring a set of FHE operations implementing a computation and/or as a system for reducing the size of encrypted data items for use in a computation using fully homomorphic encryption (FHE) cryptography.

System 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may store encrypted data items, e.g., received from one or more data-providers or generated as intermediate results or end results, e.g., outputs, of the computation. Typically, most or all data items on which the computation of system 110 is performed is encrypted with a key that is not known to system 110—that is system 110 may not be configured to obtain the plain data items corresponding to the encrypted data items, e.g., such as stored in storage 140. The decryption key in plain form is secret for system 110, though the encryption/decryption key may be available in encrypted form. For example, the processor system may be configured to perform a sequence of FHE operations, and may apply clipping, e.g., to improve efficiency, reduce latency, reduce storage size, and so on.

System 110 may communicate internally, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In system 110, the communication interface 150 may be used to send or receive digital data. For example, system 110 may be configured to receive encrypted data items from an external computer, e.g., a data-provider computer. For example, system 110 may be configured to transmit computation results to an external computer, typically, in an encrypted format. For example, communication interface 150 may be used for internal communication in system 110, e.g., to distribute the computation of multiple computation entities, e.g., computing devices.

The execution of system 110 may be implemented in a processor system, e.g., one or more processor circuits, e.g., microprocessors, examples of which are shown herein. System 110 may comprise multiple processors, which may be distributed over different locations. For example, system 110 may use cloud computing.

Some of the figures show functional units that may be functional units of the processor system. For example, a figure may be used as a blueprint of a possible functional organization of the processor system. The processor circuit(s) are not shown separate from the units in most figures. For example, the functional units shown in FIG. 2 (see below) may be wholly or partially implemented in computer instructions that are stored at a system such as system 110, e.g., in an electronic memory of system 110, and are executable by a microprocessor of system 110. In hybrid embodiments, functional units are implemented partially in hardware, e.g., as coprocessors, e.g., arithmetic and/or cryptographic coprocessors, and partially in software stored and executed on system 110.

Figure 1B:
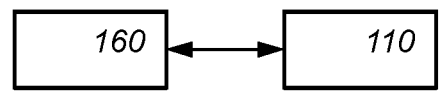

FIG. 1b schematically shows an example of an embodiment of a system for performing a computation using FHE. FIG. 1b shows the FHE system of FIG. 1a in the context of a data-provider system 160. FHE system 110 is configured for performing a computation using fully homomorphic encryption (FHE) cryptography.

For example, system 110 may be configured to receive encrypted data items from a data-provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

System 110 may be configured with a number of FHE operations, e.g., sometimes referred to as gates. For example, an FHE system may be configured with a so-called NAND-gate. For example, an FHE system may have an addition and a multiplication operation, e.g., in a finite field, or finite ring, or the like. The operations of the FHE operation are in principle sufficient to perform a wide range of computations, with the exception that the size of the computation may be limited, e.g., if the FHE system is a leveled system without a bootstrap operation, or without a bootstrap operation being employed.

Typically, encrypted data in an FHE system involves some measure of noise. For example, encryption of a data item may comprise mapping the data item to a point in a key-dependent lattice, to which some noise is added.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many FHE schemes could be attacked with linear algebra, or other efficient algorithms, e.g., lattice-based algorithms. When a data item is encrypted, noise is added that is chosen so that attacks are hard while FHE operations can still be performed. Most FHE operations will increase the noise that is inherent in an encrypted FHE data item. When many such operations are performed, the noise will reach a level that unique decryption is no longer possible. At that point the scheme breaks down. Generally speaking two approaches have been developed in the art to deal with this phenomenon. The first is a leveled FHE. A leveled FHE can perform some number of operation one after the other. The leveled FHE is designed such that the worst case noise at the end of such a number of operations is below a bound needed for decryption. Another approach are so-called bootstrapping operations. A bootstrapping operation reduces noise in an encrypted data item. A bootstrap operation is possible if the FHE is strong enough to perform the decryption operation in the encrypted domain—sometimes called a bootstrappable FHE. For example, a bootstrapping operation receives helper data related to the encryption key that allows removable of the noise without allowing decryption of the encrypted data items. Typically, the helper data is an encrypted version of the key used to decrypt the data item. Note that the decryption key may be the same as the encryption key, in case of symmetric encryption, or may be distinct therefrom, e.g., in case of a public-key based FHE.

Although the bootstrap operation performs the decryption of an encrypted data item, counterintuitively the decryption is performed in an encrypted domain, so that the decryption does not actually reveal anything about the plain data item. The bootstrap operation then performs the noise removal—typically by rounding. The result is an encrypted data item, with a lower, fixed noise level. Typically, the noise present in the ciphertext resulting from bootstrapping results from the bootstrap operation After the bootstrap, a new sequence of FHE operations can be performed until the noise level becomes so high, that a new bootstrap operation is needed.

Interestingly, even if a bootstrap operation is available in a particular FHE scheme, it may not be employed. For example, if the computation has a low depth, say compute the average of multiple numbers, compare two numbers, etc., which fits within the bound of the leveled FHE scheme, then the entire computation can be done, which may involve the application of multiple FHE operations, without bootstrapping. Although the noise level in the computation result, e.g., the average, will be higher than the noise at the input, the FHE parameters of the FHE scheme can be chosen such that the operation can be done without bootstrapping. For example, a given FHE scheme may be configured to evaluate circuits, e.g., circuits of arithmetic or Boolean gates. The FHE scheme may be leveled, e.g., limited to circuits of a certain depth. If more complicated computations are needed, e.g., the evaluation of a larger medical model, e.g., the evaluation of a neural network, e.g., the evaluation of an image classifier, then bootstrap operations may be interspersed with the other FHE operations. Bootstrap operations have the advantage of reducing noise, and so increasing the number of operations that can be performed one after another, but they have the downside of being relatively resource heavy operations. How many bootstrap operations are needed depends on the FHE scheme. For example, in an FHE scheme of a relatively low-level, a bootstrap operation may be needed after evaluation of each gate. For example, in another configuration, relatively many FHE operations can be performed before a new bootstrap becomes needed.

Determining when a bootstrap is needed can be done by keeping track how large the noise level will be, e.g., assuming a worst case scenario. Instead of a worst case scenario, an average case may be assumed, although this may increase the risk of a computation result which cannot be decrypted. As further explained herein, this analysis may be done before hand, but may also be done dynamically. The noise-increase may depend on the particular computation. For example, an FHE multiplication increases noise by an amount that depends on the multiplicand.

It was an insight of the inventor that in some parts of a computation the noise in encrypted data items may be lower than allowed for. For example, noise levels may be engineered on a worse case assumption and for the worst parts of a computation. In another part of the computation, e.g., just before a decryption operation, or before a bootstrap operation, etc., the level of the noise may be lower than is needed to successfully perform these operations. By clipping an encrypted data item, e.g., artificially decreasing the size of an encrypted data item, its noise level will be increased, but if this happens at a location where such low noise is not needed, then advantages associated with a smaller bit-size are gained without the downside of substantial higher risk of failed decryption.

For example, a set of encrypted data items may be received encrypted according to some standard noise-level. If the computation is of low complexity, e.g., a linear operation such as computing an average, which fits easily in the level of the FHE scheme, then the received encrypted data items or some intermediate values may be clipped to shorten their size. Although their noise level will increase due to the clipping, this is no objection if the complexity of the computation is such that it can still be performed even on encrypted data items with increased noise.

Likewise, if a computation is more involved and involves a bootstrap, then it will generally be needed that an input noise level is below some noise bound so that the bootstrap can be performed. However, if the operations preceding the bootstrap increased the noise to a level below the bound, then the noise level can be artificially increased by clipping the encrypted data item. The noise increase will be undone by the bootstrap after which the encrypted data items have a fixed amount of noise. Clipping may be done before a bootstrap operation, but may be done earlier, so that one or more operations are performed on the clipped encrypted data before the bootstrap is performed.

FHE schemes can be applied in many settings. For example, FHE system 110 may be operated by a cloud provider. The cloud provider may offer computation and storage services to its clients. By employing FHE encryption, data-provider 160, e.g., a client of the cloud provider can send their data in encrypted form. The cloud provider can still perform the required computations, and/or the required storage, but will not be able to know the corresponding to plain data. For example, data-provider 160 may use an encryption key of a type corresponding to the particular FHE system used, to encrypt the data items. When computations results are received by data-provider 160 from FHE system 110, a corresponding decryption key may be used to decrypt the encrypted data items. Encryption and decryption key may be the same—and typically are so.

For example, system 110 may be configured to train machine-learning models, e.g., image classifiers, e.g., medical models, without having access to the plain data items. For example, linear regression may be performed on the input data, possibly, even without bootstrapping. For example, backpropagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data.

After the model is trained, the FHE system 110 may be used to offer the model for use in medical data. This can be done with plain model parameters or encrypted model parameters—in both cases with encrypted data, e.g., encrypted input, intermediate and output data. Using plain model parameters, is usually much more efficient as noise levels can be better predicated so that more aggressive clipping may be employed, e.g., clipping off more digits of an encrypted data item. In both cases, an effect of the system is that a computation is performed, say an image classification, e.g., a medical image classification, without the computer knowing the plain data items. For example, a mammogram may be evaluated for cancer, without the image ever being in the plain at system 110 and without system 110 knowing what the outcome of the cancer evaluation is. From a privacy point of view it may be acceptable, to operate a plain model on encrypted privacy sensitive data, while it might not be acceptable to operate on plain privacy sensitive data.

Other applications involve, data base services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 110 may be used for protected control of a device. For example, a device, even a large device such as a power plant, may send sensor values to system 110 and receive encrypted control signals in return. The control signals being computed from the sensor signals. An attacker of the system may be able to determine the contents of data going to and from system 110, or even gain access to intermediate data of system 110, but he will not be helped by that as the data is encrypted. Even a full break of system 110 will not reveal the data, as the decryption key is not known to system 110. Computing the control signal may involve such mathematical operation as linear algebra, averages, matrix multiplication, polynomial evaluations, and so on, all of which are possible to execute with FHE operations.

Figure 2:
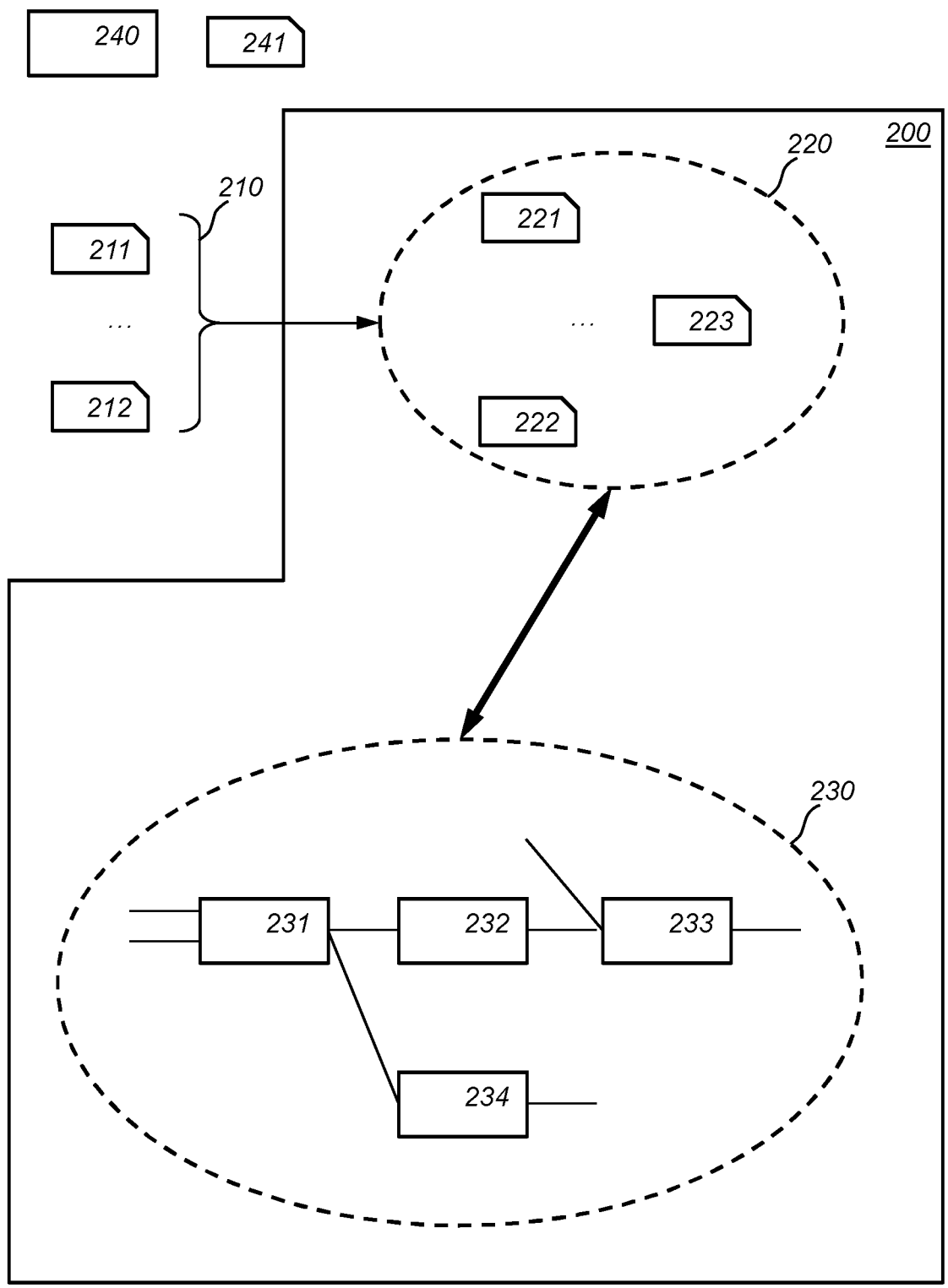

FIG. 2 schematically shows an example of an embodiment of a system 200 for performing a computation using FHE. For example, the system of FIG. 2 may be implemented in an FHE system such as system 110. Shown in FIG. 2 are one or more encrypted data items 210. Shown are encrypted data items 211 and 212. For example, a data-provider system, such as data-provider system 160, may encrypt corresponding plain data items with an encryption key 241, e.g., using an encryption component 240.

The encrypted data items may be used by the FHE system to perform the computation upon. For example, a pool 220 of encrypted data items may be maintained in the FHE system. For example, the FHE system may be configured to apply an FHE operation to one, two or more encrypted data items in pool 220. The result will be a new encrypted data item that may be stored in the pool. Pool 220 may be stored in a storage of the FHE system. This may be local storage or a distributed storage. In the latter case, it may happen that one or more encrypted data items are represented multiple times in the pool. Encrypted data items may be sent from one computing device to another, if their values are needed elsewhere. Pool 220 may be implemented in various ways, e.g., as a register file, an array, various data structure, and so on.

For example, in an FHE scheme based on the Learning With Errors (LWE) problem, e.g., such as the FHE system on the Torus mentioned in the background, an encryption key may be a string of n numbers, e.g., bits, $s_i$, a cipher text may be a tuple $(a_1, \ldots, a_n, b)$ with $b - \Sum_{j=1}^{n} s_j \cdot a_j = \mu + e$. In the latter, + and − respectively represents the addition and the external product between integers and torus elements, $a_i$ are n numbers, $\mu$ is the plain data item, and e is the noise, e.g., drawn from a probability distribution, e.g., a Gaussian distribution. This scheme naturally extends to other mathematical structures, including based on polynomials. The numbers $s_i$, $a_i$, b, u, e may therefore be taken from a different mathematical structure. Not all encrypted data items need to be encrypted under the same key, and in fact re-encryptions with a different key is a possible FHE operation. Furthermore, not all encrypted data items need to be the same size, e.g., dependent on the intended use. For example, a data item may be encrypted as a matrix rather than a tuple—for example, the rows or columns of the matrix may be tuples as above. One might encrypt each of the tuples in the matrix with a different key.

Accordingly, encrypted data items, such as encrypted data item 210 or 220 may comprise a tuple of numbers, e.g., the integers modulo a modulus. Encrypted data items, such as encrypted data item 210 or 220 may comprise a tuple of polynomials, e.g., the integers modulo an integer modulus and modulo a polynomial modulus. For example, the polynomial modulus may a cyclotomic polynomial, or the like, etc.

The tuple s may be regarded as the encryption key of the encryption item. In this case, the decryption key may be taken to be identical to the encryption key. Accordingly, the decryption key corresponding to the encrypted data item may thus comprise weights for a linear combination of the elements in the tuple representing the encrypted data item. In this the above example, the weights in s together with a weight of −1 for b produces a combination of a plain data item and noise after decryption, in this case the value $\mu + e$.

Rounding the latter provides the plain data µ. In an embodiment, an encrypted data item comprises a tuple; a decryption key corresponding to the encrypted data item comprises weights for a linear combination, said linear combination of the tuple producing a combination of a plain data item and noise.

More generally, a lattice may be defined, and an encryption may be a mapping of a plain text into the lattice and adding noise e. FHE operations may be defined on such elements. Decryption may comprise rounding to the nearest lattice point and decoding the lattice point into plain data. Typically, a level of noise is associated with an encrypted data item in an FHE scheme. The underlying FHE scheme that is used defines one or more operations that can be performed on encrypted data items. Typically, the noise that is associated with an encrypted data items increases as operations are performed on it. The exception being a bootstrap operation which can reduce the noise associated with an encrypted data item.

The encrypted data items 210 may represent all kinds of data. For example, encrypted data items 210 may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a color pixel may be represented by a multiple color level, e.g., RGB levels, which in turn may be represented by a tuple of encrypted data items. For example, three 256-level colors may be encoded in three encrypted data items. How many encrypted data items are used to represent some type of data depends on the capacity of the FHE scheme. For example, more restrictive FHE scheme may only be capable of encoding one bit per encrypted data items. In that case, one color pixel, may require 24 encrypted data items.

Although without access to the decryption key it may not be possible to say exactly how large the noise is, one can typically bound the noise, e.g., as the initial noise level is known for a fresh encryption and the noise increase for various operations are known. Noise increase may depend on the type of operation, e.g., addition versus multiplication, and on the other parameters if any. For example, an FHE operation may be multiplication with a known, e.g., plain value, e.g., multiplication by 2, multiplication with a known polynomial, and so on. For example, multiplication with a larger value may increase the noise more than multiplication with a smaller number. Exactly how much noise increases given the operations performed can be calculated mathematically, or could be estimated empirically. While some operations may add significant amounts of noise, other may not add noise, e.g., an addition with a plain constant.

A set of FHE operations may be defined for the computation. For example, from the FHE operation a network or circuit of operations may be build that together implement the computation. For example, a computing network 230 or computing circuit is shown in FIG. 2. Network 230 comprises multiple FHE operations 231-234. For example, some may be additions, some may be multiplications. For example, the operations may be Boolean operations. For example, the operations may all be NAND operations. The way the FHE operations are combined, e.g., which operation is applied to which operand in pool 220 determines the computation that is being performed. For example, the computing network 230 may be represented as a list of FHE operations that are to be performed together with an indication on which FHE encrypted data item they are to be performed. For example, network 230 may be represented as a graph. For example, the representation of network 230, may indicate which operators depend on which other operator, e.g., with an edge in a graph. For example, the representation may indicate an order in which operations are to be performed.

As operations are performed, the noise associated with the new computed (not-fresh) encrypted data items may grow. This is not a problem so long the noise stays within a limit needed for decryption. If more operations are to be performed a bootstrapping operation can be performed.

The size of encrypted data items in an FHE scheme can be quite large. Moreover, the more operations an FHE scheme is to perform without a bootstrapping operation the larger the size of an encrypted data item typically will be. Likewise, a higher resistance against attacks may be obtained with larger FHE parameters and in turn with larger encrypted data items. For example, the data items may be mapped to an FHE system featuring larger FHE parameters, so that more noise can be added while still being able to successfully perform operations. A larger size of encrypted data items can be problematic.

Typically, the level of noise is designed so that in the worst parts of the computation, with the worst operation parameters, and/or the worst input values the likelihood of successful completion of operation is sufficiently high, so that eventual decryption when the computation completes will most likely be successful. Even if an average situation were assumed instead of a worst-case assumption, it will be the case that at some places the noise levels that can be accommodated are over engineered. That is, in one or more places in the computation the operations are configured for a higher noise level than they will actually encounter in practice. A clipping operation can take advantage of these situations.

By clipping an encrypted data, its storage size decreases, e.g., the number of bits needed to store or transmit the encrypted data item. On the other hand, clipping will increase the noise level in the encrypted data level. Reducing the size of an encrypted data items by clipping has several advantages. A particularly important advantage is reduced latency when an encrypted data item is transmitted. Transmission of encrypted data items may be, for example, a frequent operation when a computation is distributed over multiple computing devices. Reducing the size of an encrypted data item decreases latency and thus enables distributed computing. This is particularly advantageous as state of the art FHE operations are becoming so fast that larger and larger computations are feasible to be performed in FHE. For such large computations, it is especially advantageous if they can be performed on multiple computers. Computing on multiple computers has the advantage of load-balancing. Computing on multiple computers also has the advantage of using parallelism to increase computation speed.

The clipping is performed at a location in the computation where after the artificial increase in the noise level, said noise level will nevertheless stay within the range of noise levels that can be handled by one or more subsequent operations. Artificial noise increase refers to a noise increase resulting from a clipping operation, as opposed to the natural noise present in fresh ciphertexts and the noise resulting from operating on ciphertexts.

Two operations are of particular importance in this respect: bootstrapping and decrypt operations. If all operations that depend on a clipped encryption up to and including a bootstrap or decrypt operation can handle the increased noise level, then the effect of the clipping has been resolved. This is because the bootstrap operation resets the noise level to that to a predetermined value, while a decryption removes noise completely. Thus these two operations eliminate the artificially increased noise level, assuming they themselves can be successfully performed.

Note in this respect that the decrypt operation will typically not be performed on FHE system 200, but on a client computer, e.g., the data provider that sent the encrypted data items 210. A decryption component 250 may be configured to decrypt an output of system 200, e.g., using a decryption key. For example, the decryption key may be the same as encryption key 241, in case of symmetric encryption. For example, the decryption key be a decryption key corresponding to encryption key 241 but distinct from it, e.g., in case of asymmetric encryption. Decryption component 250 may be comprised or connected to data provider 160.

A bootstrap operation would be computed on system 200, but note that a computation may not comprise a bootstrap, e.g., may not need it. If the computation fits in the level of the FHE scheme, e.g., if the computation is fairly simple, then no bootstrapping is needed. Modern FHE schemes allow ever more computations to be computed without bootstrapping, and this trend is expected to continue.

There are various ways to perform a clipping operation. For example, if an encrypted data item comprises a tuple of numbers, then the clipping operation may be performed separately on the numbers in the tuple. If the tuple comprises multiple polynomials the clipping may be performed on the coefficients of the polynomials. Note that even if polynomials are used, then typically an encrypted data item will be represented as a tuple of numbers as well, e.g., the vector of the coefficients of the polynomials.

For example, an encrypted data item may be clipped by discarding one or more digits. For example, least significant digits of the numbers representing the encrypted data items may be discarded. Discarding a digit may comprise discarding corresponding bits that are used to represent the digit. Discarding one or more digits may also directly correspond to discarding bits, e.g., if the numbers are represented in a ring or field with a number of elements which is a power of 2, e.g., a characteristic two ring/field. For example, in a characteristic 3 field/ring a clipping operation may discard a base-3 digit. The base 3 digits may be internally represented as a two bit number, so that clipping one base-3 digit provides a 2 bit reduction. A base-3 number may also be represented in bits in full, and not on a per-digit basis. In that case digits may still be discarded; for example, a number stored as bits, may be converted to a base 3 representation, one or more digits may be discarded, after which the number may be converted back to a bit-representation. The end-result is still that noise increased and bit-size decreased.

Discarding can be done by removing the digit and possibly freeing the storage space, alternatively, the discarded digits may be replaced by zero, etc. Note, that in addition to discarding digits the remaining digit may be altered. For example, discarding a digit is preferably done by rounding the number—that is rounding to the nearest number. Other ways to clip are by scaling the number, e.g., scaling towards a smaller range of numbers. The scaling may be followed by a rounding operation. Instead of rounding, a floor or ceiling operation may be done. Discarding can be done by truncating. Rounding is preferable to floor or ceiling operations since a rounding introduces less noise, yet achieves the same reduction in the storage size. Note, that because of carry, rounding may propagate.

For example, given an encrypted data item represented as a tuple $(x_1, \ldots, x_{n+1})$, e.g., in the example above this may be the tuple $(a_i, \ldots, a_n, b)$. The elements in the tuple may be numbers, e.g., in a ring, a field or another mathematical structure. The clipping may be implemented as a function that may be applied per component. For example, a function c, e.g., as in one of the examples given herein, may be applied as $(c(x_1), \ldots, c(x_{n+1}))$, the function c may, say, be a truncation+rounding operation.

More generally speaking, clipping may be performed by reducing the resolution of the encrypted data item. By reducing resolution noise increases and storage size decreases. For example, one may take the most significant part of the representation and rounding the nearest value.

Figure 1C:
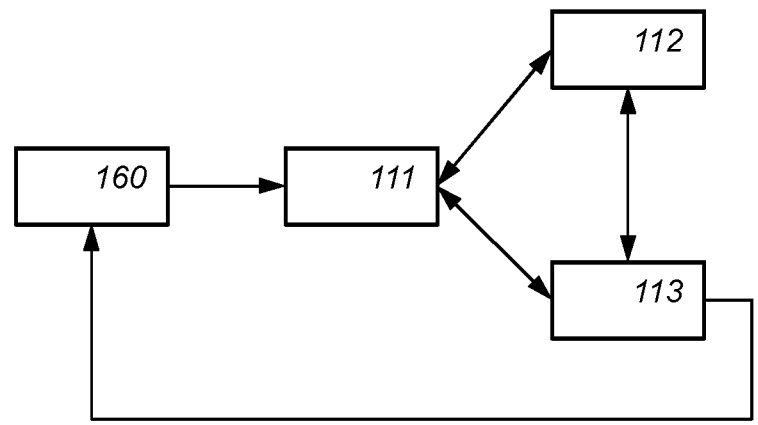

FIG. 1c schematically shows an example of an embodiment of a system for performing a computation using FHE. Shown in FIG. 1c is the data-provider system 160, and three FHE devices. Devices 111, 112, and 113. Each of devices 111, 112, and 113 are capable of performing FHE operations on encrypted data items and/or clipping operations. Together the three devices form the FHE system. There may be two or more than three FHE devices cooperating to form an FHE system.

In the case of FIG. 1c, the computation is distributed over multiple FHE devices, in the example shown, three FHE devices. For example, one of the multiple FHE devices may transmit encrypted data items to one or more of the other multiple FHE devices, e.g., received encrypted data items or intermediate encrypted data items, e.g., partial computation results. Likewise, each of the multiple FHE device may be configured to receive encrypted data items from the other device.

As the encrypted data items in an FHE system can be fairly large, transmitting the data among the FHE device can cause significant overhead. One or more of the FHE devices may perform a clipping operation before transmitting an encrypted data item. This reduces transmission latency. Especially in computations that are interrelated to a high degree, e.g., a neural network computation, the clipping operation may provide an important reduction of the total computation time.

For example, FHE device 111 may receive encrypted data items from data-provider 160. FHE device 111 may clip a received encrypted data items and transmit it to device 112 and/or 113. For example, FHE device 111, 112 and/or 113 may perform one or more FHE operations to obtain an intermediate encryption data item, clip the intermediate encrypted data items and transmit it to one or more of the other devices. A clipping may be done just before transmitting, but may also be done earlier, so that, e.g., an FHE operation is performed on the clipped encrypted data item before transmitting it. The multiple FHE devices cooperate together, sending and receiving encrypted data items as needed, so that they together can perform the computation, preferably, at least in part in parallel.

Interestingly, a device can clip an encrypted data item before transmitting it but keep the unclipped data item locally. This has the advantage that locally the encrypted data item has a lower noise, so that, e.g., a bootstrap operation can be postponed, while it also has the advantage to reduce latency. At the receiving device a bootstrap operation may be performed earlier. Accordingly, the computation may be done at least partly in parallel on at least a first device and a second device.

For example, consider a first operation $f$ on a first device A, and a second operation g on a second device B. For example, suppose the following A: computes $f(x1, x2)$. A needs to receive the encryption of x1 and x2.
    B: computes $g(x1, x3)$. B needs to receive the encryption of x1 and x3.

The encrypted data items may be large, so sending these ciphertexts increases the latency time. Suppose for example, that device B, has an encryption of x1 and x2, but device A needs them. For example, device B may clip these encrypted data items and send them to device A. For example, at device B there may be a computation on an encrypted data item, say that produces an encryption of x2, where, say $h( \ldots, x4, \ldots )=x2$. Device B may then perform clipping, and send the clipped encryption of x2. When computing with clipped values, care should be taken that the clipped part, e.g., may interact as well. This may be resolved by replacing the clipped values with zeroes; for example the remaining part after a clipping operation may be padded with zeroes.

A particular advantageous way to represent encrypted values is to use a signed-digit representation. In signed-digit representation the digits are selected from $\pm d$, with $d \leq radix/2$. As noted herein, the radix may be 2 or a power of 2, or more generally any integer. An advantage of signed-digit representation is that the noise increase due to clipping is on average smaller. For example, the number 64 in radix 10 could be written as $(1)(-4)(4)$; for example, to represent 111 in radix 2, one may write $100(-1)$.

Signed-digit representation can be used in clipped values as well. If needed numbers in regular digit representation may be converted to signed-digit representation, e.g., as part of the clipping operation.

If needed, device A may first perform bootstrapping on the received data item before function $f$, or perform a boot-strap+function combination, e.g., a combination of bootstrap and function $f$, e.g., a boostrap+activation function. An advantage of bootstrapping received data, is that it is easier to compute how much can be clipped; for example, one can clip a number of digits with a noise increase that is as much as will fit in the remaining noise reserve of the encrypted data item.

Figure 1D:
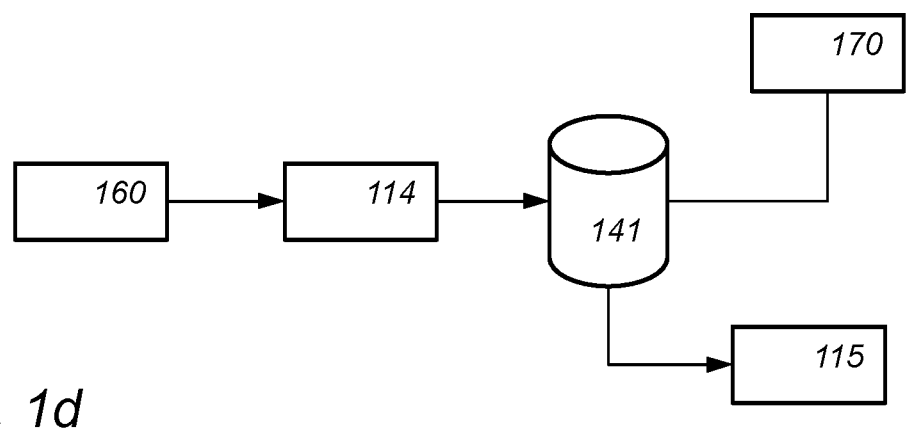

FIG. 1d schematically shows an example of an embodiment of a system for performing a computation using FHE. In the example shown in FIG. 1d, encrypted data items are stored for later FHE processing.

For example, an FHE system 114—which may be a single device or multiple devices, e.g., as in FIG. 1c, may store an encrypted data item in a storage 141. Storage 141 may be a local storage or an online storage, e.g., a cloud storage. For example, an FHE device 115 may later retrieve encrypted data items from storage 141 and apply FHE operations to it.

For example, storage 141 may store a database of encrypted data items. For example, the database may be a medical database, e.g., storing genomic information. For example, the storage 141 may store other types of data, e.g., sensor data, etc., and perform computations on them.

Before storing an encrypted data item, FHE system 114 may first clip the encrypted data item. This reduces storage requirements of the encrypted data items. Alternatively, an encrypted data item may be stored unclipped. A data-size reduction device may at a later point in time perform clipping operations. For example, FIG. 1d shows an optional data-size reduction system 170. Data-size reduction system 170 may be configured to retrieve one or more encrypted data items from storage 141 and apply a clipping operation on the encrypted data items, thereby reducing a bit-size of the encrypted data item and increasing an associated noise level of the encrypted data item. An FHE system that later uses the clipped data may perform a bootstrap operation if needed to reduce the noise level back to a lower level. Size reduction system 170 may perform other functions, e.g., the clipped encrypted data items can be repacked to better utilize the storage space that is opened up because of the clipping. For example, suppose that x1 and x2 are two encrypted data items, which are stored next to each other sequentially. Size reduction device 170 may clip data item x1 and move x1 so that is stored next to x2 again. For example, x1 may be moved while x2 is note or x1 and x2 may both be moved. For example, size reduction device 170 may clip all data items that can be clipped and then pack the data-items in the memory, e.g., store them next to each other.

Figure 1E:
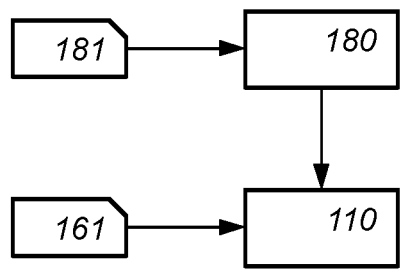

FIG. 1e schematically shows an example of an embodiment of a system 110 for performing a computation using FHE. For example, as in FIG. 1b, the FHE system 110 may receive one or more encrypted data items from a data-provider system 160. System 110 may be configured by an FHE configuring system 180.

Selecting appropriate places for clipping operation and/or bootstrap operations can be done statically or dynamically, e.g., before performing the computation or during a computation.

For example, configuration system 180 may be used statically. For example, configuration system 180 may be configured to receive a representation of the computation, e.g., computation representation 181. Computation representation 181 may be in the form of a gate list, operator list, circuit description, etc., e.g., already referring to the available FHE operation(s). The computation representation 181 may be in a higher level language, e.g., representing the formula which is to be computed. In the latter case, configuration system 180 may comprise a compiler for compiling the computation representation 181. The configuration system 180 thus obtains a set of FHE operations that are to be performed to implement the computation; as described herein the set may be a network, a graph, a netlist, and so on.

Once configuration system 180 has obtained the set of FHE operations that are to be performed to implement the computation, the configuration system 180 may estimate the noise levels of the encrypted input data items, intermediate data items, and so on. For example, the configuration system 180 may use known formulas that bound a noise level given an input noise level and the operation that is performed. Typically, the known formulas depend on the particular FHE system that is used. Although, such mathematical bounds can be formulated, in principle, noise levels could be established empirically, e.g., by simulating the system multiple times and decrypting intermediate results. Empirical evaluation is better performed statically, before the actual computation.

Based on the noise computations, configuration system 180 may determine points in the computation where noise levels become too high; configuration system 180 can counter this by inserting bootstrapping operations. This is optional however, in a typical embodiment, bootstrapping operations, if needed, are already included in the representation 181.

Based on the noise computations, configuration system 180 may determine points in the computation where noise levels are lower than needed. For example, an estimated noise level before a bootstrapping operation or before a decryption may be lower than needed by the bootstrapping or decryption operation. Note that even if the decryption operation is not done in FHE system 110, the decryption information may be included in the analysis of configuration system 180. Once it has been established that that noise is low, say below a threshold, the system can insert a clipping operation. For example, the clipping may be inserted just before bootstrapping and/or decryption; for example, clipping may be inserted one or more operations before the bootstrapping and/or decryption. Preferably, clipping is pushed back until it is before a transmission or storage step. Such transmission or storage step may be included in set 181, e.g., as dummy operations, that keep noise constant.

To decide if a clipping operation can be applied to an encrypted data item inserted before an operation, configuration system 180 may determine the encrypted data items that are derived from the selected encrypted data item, and the operations that are performed on them. For example, a network of operations may be followed forwards from the selected encrypted data items. There is no need to extend the latter search past bootstrap or decryption operations. From the operations that are then found an allowable noise level for the selected encrypted data may be derived. If it turns out that the estimated noise level for the selected encrypted data is below the allowable noise level, then noise may be increased up to this limit by inserting a clipping operating to clip the selected data items.

A simple implementation if FHE operation 181 may just limit the number of operations that are done between two bootstraps regardless of their type. Only crude bounds are needed in such a case, to select the number of operations. Such an embodiment could benefit a lot from clipping. A more complex implementation may insert more or fewer operations between bootstraps depending on the noise increase of the operations. Nevertheless, also in that case clipping opportunities remain. Moreover, one may insert additional bootstrap operation in addition to clipping operations. For example, in case of a transmission, one may insert a clipping operation before the transmission and a bootstrap operation after the transmission.

For example suppose an encrypted data item x has noise level e. An operation O is applied to x followed by a bootstrap operation B with a noise tolerance w. Further suppose, the operation doubles the noise level of x—for example the operation may be multiplication with a small number. If $2e<w$, then there may be room for clipping before operator O. For example, $e_c<\frac{1}{2}w-e$, wherein e, represents the additional noise introduced by clipping, then the clipping operation can be performed before operator O. If clipping is done after O and before B, then clipping may be considered if $e_c<w-2e$, with 2e the noise after operation O. There are various ways to express noise, for example, noise may be represented by a parameter of a probability distribution that models the noise. For example, the noise may be characterized by its mean and standard deviation; typically the mean is zero and so can be omitted.

Typically, decisions regarding clipping, bootstrapping and the like are performed before the computation is done, e.g., before the encrypted data items 161 are received. However, these decisions can also be made dynamically, e.g., after the encrypted data items 161 are received.

Configuration system 180 may also configure where the FHE operation are to be performed. For example, configuration system 180 may also insert transmission operations, and instructions to configure multiple devices to perform the FHE operations needed for the computation.

FIGS. 3a-3d schematically show various examples of an embodiment of clipping and one or more FHE operations.

Figure 3A:
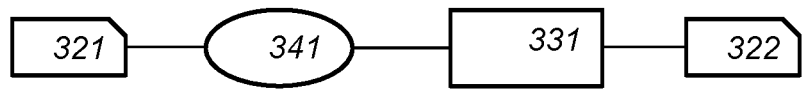

FIG. 3a shows an encrypted data item 321 on which an operation 331 is to be performed to obtain an encrypted data item 322. Typically, an FHE operation, such as operation 331 will increase the noise. So that noise in encrypted data item 322 will be higher than in encrypted data item 321. However, if the noise tolerance for encrypted data item 322 is high, while noise in encrypted data item 321 is low, then there may be room for a clipping operation 341. Clipping operation 341 increases noise, but is selected so that operation 331 can still be safely performed. Further downstream processing of encrypted data item 322 may impose further restrictions on clipping operation 341. For example, encrypted data item 322 may subsequently be transmitted, stored or the like. For example, encrypted data item 322 may subsequently be decrypted or bootstrapped. Instead of one operation 331, there may be multiple operations 331.

Figure 3B:
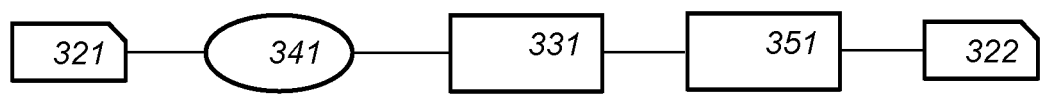

FIG. 3b shows an encrypted data item 321 on which an operation 331 is to be performed to obtain an encrypted data item 322. In this case, a bootstrap operation 351 is performed after operation 331. In FIG. 3b, the operation 331 is optional, or may be multiple operations. As there is a bootstrap operation, there will generally be more room for clipping; the clipping increases noise, but the bootstrapping decreases noise. Assuming bootstrapping 351 is successful, the noise level in encrypted data item 322 is back to a default level, regardless of the clipping operation. An advantage of performing bootstrapping on a clipped encrypted data item, is that the bootstrapping has fewer inputs and is thus a less complex operation.

Figure 3C:
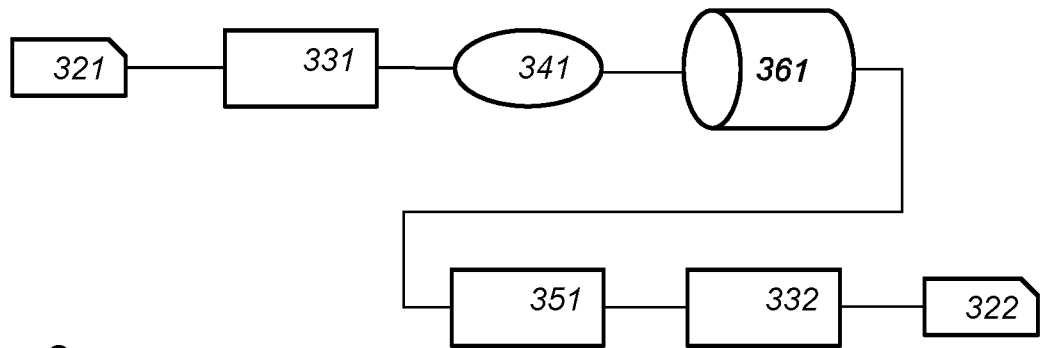

FIG. 3c shows a transmission operation 361 after a clipping operation 341. The clipped encrypted data item is transmitted transmission operation 361 to another device for further FHE processing on a further device. For example, after clipping and transmission, a bootstrap operation 351 on the further device may be performed. The bootstrap operation removes the effect of the clipping operation 341, by restoring the noise level back to a fixed noise level. After the bootstrap operation 351 there may be further operation(s) on the further device, e.g., operation 332. The encrypted data item 322 that is produced thus, might be returned to the initial FHE device, may be outputted, may be further processed, etc.

In an embodiment, an operation of the multiple FHE operations comprises a multi-sum, clipping being performed on the output of the multi-sum operation. For example, operation 331 may be a multi-sum operation.

An advantage of sending encrypted data items to another computation device is load managing. For example, computation can be performed at devices that have currently less load than other devices. An advantage of sending encrypted data items to another computation device is parallel computation. For example, two computations that depend on the same data item may be performed at the same time. For example, in an embodiment, a computation is performed at least partly in parallel on at least a first device and a second device. The first and second device may cooperate by sending and/or receiving encrypted data items clipped at least in part.

Figure 3D:
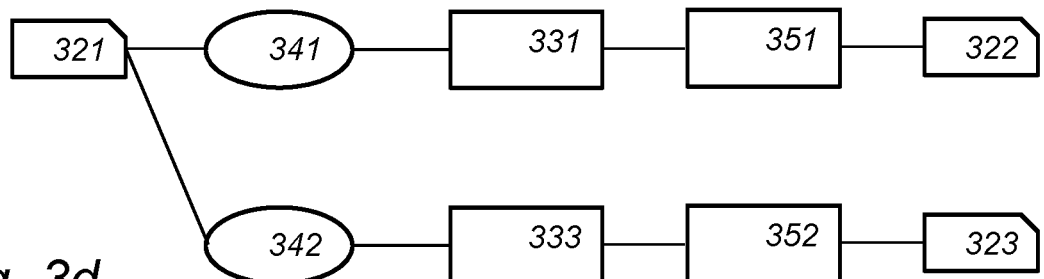

FIG. 3d shows an encrypted data item 321. Further operations may depend on data item 321, e.g., FHE operations 331 and 333; although only one operation is shown there may be multiple operations. Following operations 331 and 333 is a bootstrap operation: respectively bootstrap 351 and 352. It may be that operation 331 can handle more noise than operation 333. For example, operation 331 may be a multiplication, while operation 333 may be an addition. For example, operation 331 may be a multiplication with a small number, while operation 333 may be a multiplication with a large number. For example, operation 331 may be multiple operations, while operation 333 is a single operation, etc. Since operation 331 adds more noise than operation 333, the input to operation 333 may contain more noise than the input to operation 331.

One way to address this issue, is to have different clipping operations before operations that need different levels of noise, e.g., operations 331 and 333. For example, as shown in FIG. 3d, clipping operation 341 which operates on the input to operation 331 may clip fewer bits than clipping operation 342 which operates on the input to operation 333. After the bootstrap operations 351 and 352 the noise levels may be equal, or approximately equal.

Bootstrap operations 351 and 352 may use the same encrypted key and may produce at their outputs the same noise levels. Bootstrap operations 351 and 352 may in fact use the same or similar code. Although the input to bootstrap 352 may have fewer bits, these could be padded, e.g., with zeros.

However, in an embodiment, bootstraps operations 351 and 352, may be different. For example, they may be configured to receive a different number of bits at their respective inputs. This has the advantage that circuit 352 may be smaller than circuit 351, as it has fewer input gates. Having fewer inputs means a smaller circuit, which may perform faster and which can be stored with smaller storage size. In an embodiment, multiple bootstrapping operations, may be used, at least two of which are configured for a bootstrap input having a different number of bits.

Note that bootstrap operation may differ for other reasons. For example, as part of the FHE scheme data items may be re-encrypted for different keys. If so, then a bootstrap operation may take as input a different encrypted keys as well.

Furthermore, note that operation 331 and bootstrap 351 may be performed on a different computing device than operation 333 and bootstrap operation 352. This is not needed, operations 331,332, 351 and 352 may all be performed on the same computing device, e.g., sequentially, interlaced, parallel, etc. One or both of operations 331 and 333 may be omitted. A transmission may be included in FIG. 3d, e.g., after the clipping operation 341 and/or 342. Operations 331 and 333 are optional, and may be omitted.

Figure 4A:
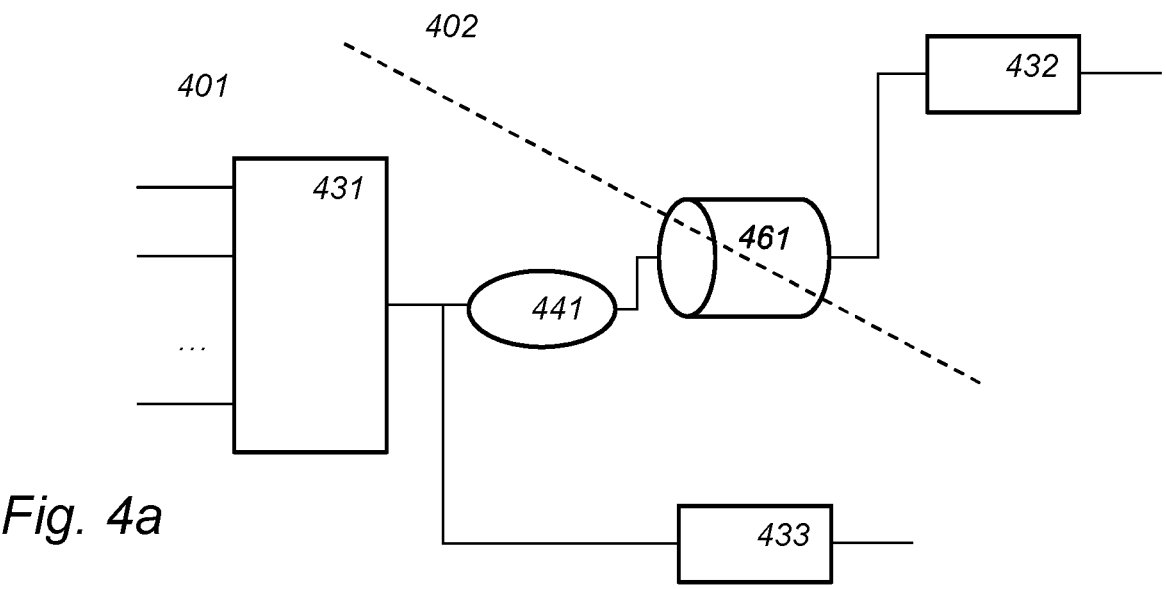

FIG. 4a schematically shows an example of an embodiment of a system for performing a neural network computation using FHE. The neural network computation may be a neural network evaluation. A neural network evaluation may be performed to obtain the output for use in an application, e.g., an evaluation of a model. The evaluation may also be done as part of a validation of the neural network. For example, the neural network may be evaluated for a validation sample, so that the weights and topology of the neural network is validated if the output for the sample resembles the expected output. An input to the neural network may be an image. For example, a pixel of the image may be represented by one or more encrypted data items.

Figure 4B:
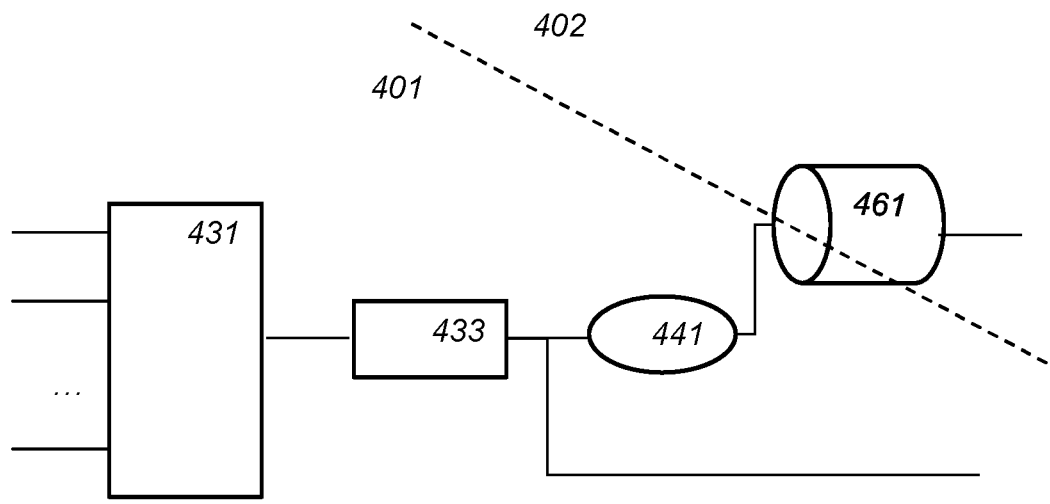

In the examples shown in FIGS. 4a and 4b the computation is performed at least partly in parallel on at least a first device and a second device. One or more nodes, or part thereof, are computed on a first computing device while one or more other nodes or part thereof are computed on a second computing device.

FIG. 4a shows a multi-sum operation 431. The multi-sum may be given inputs $x_i$, $i>0$ which may be represented by input-lines at the left of operation 431. The multi-sum may compute $\omega_0 + \Sigma x_i \cdot \omega_i$ in which the numbers $\omega_i$ represent weight and $\omega_0$ represents a bias. There may be multiple inputs and weights, e.g., at least two, at least four, at least 256, and so on. A bias $\omega_0$ may or may not be included in the multi-sum. In an embodiment the inputs $x_i$ are encrypted data items, e.g., they may represent inputs of the neural network, e.g., pixels, or they may represent outputs of other neural network nodes. The weights $\omega_i$ and bias $\omega_0$ may be encrypted data items, but they may also be plain data items. The former has the advantage that the computing system does not need access to the plain neural network, which may prevent it, e.g., from using it for its own computing purposes. The latter has the advantage that the computation may be performed faster, and that more accurate bounds on noise propagation are possible. It is also possible that some inputs are plain and some are encrypted data items. For example, some inputs to the neural network may be encrypted data items, while some may be plain data items. A computation involving only plain data items may remain plain, while a computation involving an encrypted data item will be an encrypted data item.

The output of multi-sum 431 may be an encrypted data item, and may be clipped in clipping operation 441. The output of clipping operation 441 may be transmitted 461 to another computing device. For example, multi-sum 431 and clipping 441 may be performed on a first FHE device 401, while transmission 461 may be to a second FHE device 402. After the multi-sum an activation may be performed. Preferably, a combined FHE bootstrap and activation-function operation 432 is performed at device 402 and a combined FHE bootstrap and activation-function operation 433 is performed at device 401. An advantage of clipping 441 before transmission 461 is that the transmission is done over fewer bits and so has lower latency.

If weights $\omega_i$ are known, e.g., plain, then clipping 441 can often clip more bits. For example, if many of the weights $\omega_i$ happen to be low, or possibly even zero, then the multi-sum operation will introduce little noise, and clipping 441 can be more aggressive. If many of the weights $\omega_i$ happen to be large then the multi-sum operation will introduce more noise, and clipping 441 has to be more conservative; clipping 441 may even have to be cancelled for some nodes. Activation/bootstrap function 433 can operate on the clipped data, like operation 432, but this is not needed. As shown bootstrap 433 operates directly on the unclipped data. This has the advantage of not increasing a failed decryption risk down the line unnecessarily. On the other hand, bootstrap 433 could operate on the clipped output of clipping operation 441. The latter has the advantage that bootstrap operations 432 and 433 can be identical operation. Moreover, they can both operate on clipped data.

Interestingly, the activation functions that are performed in a typical neural network node, after the multi-sum, e.g., after a weighted linear combination of input values, can be combined with a bootstrap operation in a single circuit.

One way to view a bootstrap is to see it as an evaluation of the decryption, all performed as FHE operations over encrypted data, i.e., under the veil of encryption, yielding a new ciphertext. This is possible for example if the computation complexity, e.g., the circuit depth of these operations is less than the number of operations that can be performed in the FHE scheme, taking into account that previous operation(s) have already been performed. If the FHE scheme does not allow many operations or if the decryption complexity is high, then the combination of a nand-operation followed by the bootstrap may be the best one can do, but if the FHE scheme allows more operations, than there is room in the bootstrap to perform other operations as well. As FHE schemes are getting increasingly efficient this is an attractive possibility. Using an encrypted key to decrypt as FHE operation is typical way to do bootstrapping; for an embodiment this is not necessary though, for example, any helper data may be used that allows reduction of noise not necessarily an encrypted key.

The inventors have found that bootstrap operation, say bootstrap 433 and/or 432 may combine bootstrapping with the evaluation of a function; for example the bootstrap may combine a decryption, an activation function, and an encryption—all as FHE operations operating on encrypted data. An example of an activation function is a sigmoid function. Examples of activation functions include: Linear or Identity Activation Function, Non-linear Activation Function, Sigmoid or Logistic Activation Function, Tanh or hyperbolic tangent Activation Function, ReLU (Rectified Linear Unit) Activation Function, Leaky ReLU, etc.

In FIG. 4a, a node is split, e.g., partitioned, half-way. The multi-sum is computed on one side, while the activation function (possibly combined with a bootstrap operation) is performed both on device 401 as on device 402.

FIG. 4b schematically shows an alternative way of partitioned the neural network node. Shown in FIG. 4b is a multi-sum 431, which may be the same as in FIG. 4a. Following the multi-sum is an activation function 433 and a bootstrap operation, possibly combined. The output is clipped and transmitted in 461 to system 402. The output may also be used further in device 401. As shown the unclipped data is used further in device 401, while the clipped data is sent to device 402. It is also possible to continue computations with the clipped data at device 401 as well as on device 402.

An advantage of the system shown in FIG. 4a is that clipping is done just before a bootstrap operation. Just before a bootstrap is good moment to clip as the bootstrapping will restore the noise level just after the clipping. This means that latency is reduced well in FIG. 4a. A disadvantage of the system of FIG. 4a is that the activation function is computed twice; so that the total amount of work increases. The latter may not be particularly important, as the cost of work decreases due to parallelization. On the other hand in FIG. 4b the clipping is performed after the activation/bootstrap function. For clipping 441 this has the advantage that little noise is present so potentially a lot can be clipped but on the other hand the operations, e.g., nodes that follow after the clipping must still be performed and their noise requirements must be taken into account.

In both FIGS. 4a and 4b there is the advantage of reducing the amount of data before transferring. Interestingly, a system designer may not have to make a conscious decision between FIGS. 4a and 4b since the placement of clipping operations may be optimized and automated.

The two approaches of FIGS. 4a and 4b can be combined, e.g., clipping after a bootstrap, then transmit and perform another bootstrap operation at the other computing device. This will allow for maximum clipping, at the expense of an additional bootstrap operation.

FIG. 4c schematically shows an example of an embodiment of computing a multi-sum using FHE. The amount of noise in the multi-sum may determine clipping ability. For example, in FIG. 4a the clipping 441 can perform better if the output of multi-sum 431 is lower.

FIG. 4c shows a way to compute a multi-sum. The multi-sum is split over two summing operations. Shown is a first multi-sum 434 the output of which is bootstrapped and then given as an input to the next multi-sum 436. For example, given inputs $a_i$ and $b_i$ and weights $\omega_i$ and $\psi_i$ then multi-sum 434 may compute $\Sigma a_i \omega_i$, and multi-sum 436 may compute $y + \Sigma b_i \psi_i$, wherein y is the output of bootstrap 435.

The output of multi-sum 436 may be used as in FIG. 4a or 4b or their variants. For example, in the first part of the multi-sum 434 the higher weights may be used, so that the noise can be controlled in bootstrap 435. After multi-sum 436 may be a clipping operation, e.g., followed by transmission or an activation function, which may be followed by a clipping.

FIG. 4c may also be used without clipping. FIG. 4c may be used with multiple multi-sums and bootstraps, e.g., more than 2. The multi-sum of FIG. 4c is especially advantageous for neural network with large inputs, e.g., an image.

In an embodiment, the FHE operations comprise a first multi-sum and a second multi-sum. A computation method may comprise performing the first multi-sum operation.

performing a bootstrap operation on the output of the first multi-sum, performing the second multi-sum operation, wherein the output of the bootstrap operation is one of the inputs of the second multi-sum operation.

In the various embodiments of system 110, 111-113, 114, 115, 170, 180, 200, FIGS. 3a-3d, 401 and 402, the communication interfaces may be selected from various alternatives. For example, the interface may be a network interface to a local or wide area network, e.g., the Internet, a storage interface to an internal or external data storage, a keyboard, an application interface (API), etc.

The systems may have a user interface, which may include well-known elements such as one or more buttons, a keyboard, display, touch screen, etc. The user interface may be arranged for accommodating user interaction for configuring the systems, e.g., evaluating FHE circuits, evaluating neural networks or training neural networks, e.g., on a training set, applying the system to new sensor data, etc.

Storage may be implemented as an electronic memory, say a flash memory, or magnetic memory, say hard disk or the like. Storage may comprise multiple discrete memories together making up the storage, e.g., storage 140. Storage may comprise a temporary memory, say a RAM. The storage may be cloud storage.

The systems may be implemented in a single device. As an example, systems 110 or 200 may be implemented in a single device. They may also be distributed, e.g., over multiple FHE computing devices. Typically, the systems each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, as an example, systems 110 and 200 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. Systems may comprise multiple processors, e.g., multiple microprocessors, e.g., at least one for each computing device in the system.

Below several further optional refinements, details, and embodiments are illustrated with increased mathematical detail. Many variants are possible, as, e.g., many types of lattices, underlying mathematical structures, ciphertext representations and so on, can be used.

Embodiments below provide an efficient way to obtain a compact representation of Torus FHE-like (TFHE like) ciphertexts. For example, one may take the particular implementation of a TFHE scheme in [Chillotti, Ilaria, Nicolas Gama, Mariya Georgieva, and Malika Izabachene. 2020. "TFHE: Fast Fully Homomorphic Encryption over the Torus." Journal of Cryptology 33 (1): 34-91. https://doi.org/10.1007/s00145-019-09319-x]. A public-key variant thereof can be obtained using the generic procedure presented in [Rothblum, Ron. 2011. "Homomorphic Encryption: From Private-Key to Public-Key." In Theory of Cryptography (Tcc 2011), edited by Y. Ishai, 6597:219-34. Lecture Notes in Computer Science. Springer. https://doi.org/i0.1007/978-3-642-19571-6_14.]

However, the clipping method can generally be applied in other lattice-based encryption schemes not just on the torus.

The real torus $\mathbb{R}/\mathbb{Z}$ is denoted by $\mathbb{T}$ and the set of bits $\{0,1\}$ is denoted by $\mathbb{B}$. Let $(n,\sigma)$ be two security parameters. Security parameters depend on the required security level. It is believed that a security level of about 128 bits is obtained when setting $n=630$ and $\sigma=2^{-15}$. Let also $s=(s_1, \ldots, s_n) \in \mathbb{B}^n$ and $\mu \in \mathbb{T}$. A TLWE encryption (Chillotti et al. 2020) of $\mu$ under key $s$ is a vector $c \in \mathbb{T}^{n+1}$ of the form $$c \leftarrow \text{TLWE}_s(\mu) := (a_1, \ldots, a_n, b)$$

where $a_j \xleftarrow{\$} \mathbb{T}$, for $1 \leq j \leq n$, and $b = \sum_{j=1}^{n} s_j \cdot a_j + \mu + e$ with $e \leftarrow \mathcal{N}(0,\sigma^2)$.

An encrypted data item may comprise a matrix, e.g., comprising multiple rows or columns $\text{TLWE}_s(\mu)$, e.g., for different keys $s$.

Torus element $\mu$ entering the encryption algorithm is referred to as the plaintext. It matches a cleartext $m$ in a certain message space $\mathcal{M}$. The correspondence between cleartexts and plaintexts is given by a message encoding function, Encode: $\mathcal{M} \to \mathbb{T}$; the reverse operation is the decoding function, Decode: $\mathbb{T} \to \mathcal{M}$. We require that, for any $m \in \mathcal{M}$, the relation Decode(Encode(m))=m holds; preferably always, but at least with a sufficient high probability given the application. It is also preferred that applying the decode operation to the outcome of a computation produces the correct computation result. Here too, it is preferred that this is always the case, but there may be a tradeoff. For some applications, correct decoding is important, while for others, e.g., some failure possibility is allowed. For example, a distributed filesystem or computation system may introduce redundant storage or computation, to allow for a chance of decryption failure in a node.

Given a ciphertext $c=(a_1, \ldots, a_n, b)$, the decryption algorithm may compute the corresponding phase defined as: $\varphi_s(c) = b - \sum_{j=1}^{n} s_j \cdot a_j \pmod{1}$, which represents a noisy value of plaintext $\mu$. For example, with the above definition, one would have that $\varphi_s(c) = \mu + e$ for some $e \leftarrow \mathcal{N}(0,\sigma^2)$. When applicable, the role of the decoding algorithm is to eliminate the noise from $\varphi_s(c)$. Various decoding algorithms are known in the art to remove noise. In this example, one may round the computed phase. More complicated decoding algorithms may use for example, redundant information that has been computed along with other computed results, e.g., reconciliation data, error correction data and the like.

In the above example, the components of a ciphertext $c$ are defined over $\mathbb{T}$. In a practical implementation, they may be represented with finite precision, e.g., typically, 32 or 64 bits. Let $q$ denote a representation precision—for instance, $q=2^{32}$ if the ciphertext components are represented with a precision of 32 bits. In this case, the effect of working with a limited precision $q$ boils down to computing everything in $$\hat{\mathbb{T}} := \{(x \bmod q)/q | x \in \mathbb{Z}\} \cong q^{-1}\mathbb{Z}/\mathbb{Z} \subset \mathbb{T}.$$

In an embodiment, for example, given a torus element $u \in [0,1)$, one can expand it as $u = \sum_{j=1}^{\infty} u_j \cdot 2^{-j}$ with $u_j \in \{0,1\}$. With a precision of $\omega$ bits (and thus $q=2^{\omega}$), torus elements are restricted to elements of the form $u = \sum_{j=1}^{\omega} u_j \cdot 2^{-j} \in \hat{\mathbb{T}}$.

From the equivalence $$q^{-1}\mathbb{Z}/\mathbb{Z} \cong \frac{\mathbb{Z}/q\mathbb{Z}}{q},$$

the implementation of TLWE encryption with a representation precision $q$ may be done as in the example below. To avoid confusion, we write for $\overline{\text{TLWE}}$ the corresponding encryption algorithm.

Example (T)LWE encryption with a finite precision $q$:
KeyGen($1^\lambda$) On input security parameter $\lambda$, define positive integers $n$ and $q$ as well as a normal error distribution $\chi = \mathcal{N}(0,\sigma^2)$ over $\mathbb{R}$. Sample uniformly at random a vector $s=(s_1, \ldots, s_n) \xleftarrow{\$} \mathbb{B}^n$. The public parameters are $pp=\{n,q,\sigma\}$ and the private key is $sk=s$. Encrypt$_{sk}(\mu)$ The encryption of $\mu \in \mathbb{T}$ is given by $$\bar{c} \leftarrow \overline{\text{TLWE}}_s(\mu) := (\bar{a}_1, \ldots, \bar{a}_n, \bar{b}) \in (\mathbb{Z}/q\mathbb{Z})^{n+1}$$

with $$\begin{cases} \bar{\mu}^* = \bar{\mu} + \bar{e} \pmod{q} \\ \bar{b} = \sum_{j=1}^{n} s_j \bar{a}_j + \bar{\mu}^* \pmod{q} \end{cases}$$

for a random vector $(\bar{a}_1, \ldots, \bar{a}_n) \xleftarrow{\$} (\mathbb{Z}/q\mathbb{Z})^n$, a plaintext representative $\bar{\mu} = \lfloor \mu q \rceil \pmod{q}$, and a discrete noise $\bar{e} = \lfloor e q \rceil \pmod{q}$ for some $e \leftarrow \mathcal{N}(0,\sigma^2)$.

Decrypt$_{sk}(\bar{c})$ To decrypt $\bar{c}=(\bar{a}_1, \ldots, \bar{a}_n, \bar{b})$, use private key $s=(s_1, \ldots, s_n)$, compute (in $\mathbb{Z}/q\mathbb{Z}$)

$$\bar{\mu}^* = \bar{b} - \sum_{j=1}^{n} s_j \bar{a}_j \pmod{q}$$

and return $$\frac{\bar{\mu}^*}{q}$$

(mod 1) as the decryption of $\bar{c}$.
(End of example (T)LWE encryption with a finite precision $q$).

Note that, a normal distribution $\mathcal{N}$, that is a Gaussian distribution, is defined with a mean $\mu$ and a variance $\sigma^2$. Hence, if $X \leftarrow \mathcal{N}(\mu,\sigma^2)$ then $\mathbb{E}[X]=\mu$ and $\text{Var}(X)=\sigma^2$. A normal distribution over the real numbers induces a discretized normal distribution over $\mathbb{Z}_q$: to a real value $X \in \mathbb{R}$ one may correspond an integer value $Z = \lceil X q \rfloor \pmod{q}$ with $-q/2 \leq Z \leq q/2$.

If $q=2^\omega$, then a TLWE ciphertext may be internally represented in an embodiment by $(n+1)\omega$ bits. For n=630, a TLWE ciphertext might use a memory buffer of (630+1)*32=20192 bits (or 2.524 kB) when $\omega$=32. If $\omega$=64, the memory size is even 40384 bits (or 5.048 kB). In addition to the large memory requirements, these large ciphertexts may also incur significant latency during memory transfers or, more generally, while the data is in transit. Large memory needs are also problematic when storing encrypted data items, e.g., for long-time storage, e.g., for later use. There is therefore a need to find more compact representations for ciphertexts.

Additionally, the compact representation developed herein may be used to be lossless, in the sense that the obtained ciphertext remains valid and thus matches the same cleartext. This is not necessary though, as in some application a chance of failed decryption can be accepted, especially decreased latency is obtained in exchange for increased decryption failure risk. When clipping an encrypted data item, it is preferred that the error introduced in the ciphertext as a result of the more compact representation should be small, as this reduces impact on the system, or may allow more parts of the encrypted data item to be clipped. A less efficient reduction method is not preferred but such could still be incorporated in a working system, though with some reduced efficiency. One can mathematically proof that clipping has no impact on security.

Reducing the bit size of an encrypted data item so that it has increased noise but also decreased storage needs can be done by rounding and reducing the storage size, e.g., discarding digits, e.g., bits. Mathematically, this may be done as follows. A family of ciphertext encoding functions may be parametrized by an integer $0 < t < q$. Components $\bar{a}_j$ ($1 \leq j \leq n$) and $\bar{b}$ in a TLWE ciphertext $\bar{c} = (\bar{a}_1, \ldots, \bar{a}_n, \bar{b})$ are replaced by the clipping operation to $$\begin{cases} \check{a}_j = \lceil q/t \lceil \mathrm{lift}(\bar{a}_j)t/q \rfloor \rfloor \text{ for } 1 \leq j \leq n \\ \check{b} = \lceil q/t \lceil \mathrm{lift}(\bar{b})t/q \rfloor \rfloor \end{cases}$$

where lift: $\mathbb{Z}/q\mathbb{Z} \to \mathbb{Z}$ lifts an element of $\mathbb{Z}/q\mathbb{Z}$ to an unsigned integer in $[0,q)$ or to a signed integer in $[-\lfloor q/2 \rfloor, \lceil q/2 \rceil)$. We write $\check{c} = (\check{a}_1, \ldots, \check{a}_n, \check{b})$. It is worth remarking that $\lceil \mathrm{lift}(\bar{a}_j)t/q \rfloor$ and $\lceil \mathrm{lift}(\bar{b})t/q \rfloor$ can be encoded with $\lceil \log_2(t) \rceil$ bits. In particular, when $q=2^\omega$ and $t=2^\tau$, we have $$\check{c} = 2^{\omega-\tau} \lceil \mathrm{lift}(\bar{c}) 2^{\tau-\omega} \rfloor \pmod{2^\omega}$$

$$= 2^{\omega-\tau} (\lceil \mathrm{lift}(\bar{a}_1) 2^{\tau-\omega} \rfloor, \ldots, \lceil \mathrm{lift}(\bar{a}_n) 2^{\tau-\omega} \rfloor, \lceil \mathrm{lift}(\bar{b}) 2^{\tau-\omega} \rfloor)$$

where $(\lceil \mathrm{lift}(\bar{a}_1) 2^{\tau-\omega} \rfloor, \ldots, \lceil \mathrm{lift}(\bar{a}_n) 2^{\tau-\omega} \rfloor, \lceil \mathrm{lift}(\bar{b}) 2^{\tau-\omega} \rfloor) \in (\mathbb{Z}/2^\tau \mathbb{Z})^{n+1}$. In this case, $\check{c}$ can be internally represented as an element of $(\mathbb{Z}/2^\tau \mathbb{Z})^{n+1}$, which can be expanded to $e$ by appending $\omega-\tau$ zeros to the right (i.e., by operating a left-shift of $\omega-\tau$ positions) for each of its components. The above clipping operation introduces little noise given the size reduction of the encrypted data items. Less efficient operations include rounding down, rounding up, etc.

If $q$ is a power of two then discarded digits of the encrypted data item may be regarded as a series of bits, possibly signed-digit radix-2 digits (also known as trits). The number $q$ is allowed to be a power of some other number. In that case digits can be, say, ternary digits, etc. The number $q$ is also allowed not to be a power of some other number. In that case, clipping may be regarded as scaling integers down from a range of length $q$ to a range of smaller length, e.g., of length $t$; Preferably, one has $t < q$ and more preferably $t \leq \frac{1}{2}q$ since in the latter case one gets a least one bit of reduction. Reductions with $q > t > q/2$ is possible but may need more elaborate storing schemes to gain the benefit of such values of $t$, so that these are less preferred.

Torus learning with errors (TLWE) encryption is known to be semantically secure under the LWE assumption. One can prove mathematically, that this remains true with the new ciphertext encoding resulting from the clipping, without any security degradation. In other words, so long as decryption still succeeds correctly, it helps performance without hurting security.

The error propagation may be analyzed as in the following example. Suppose for example, that $q=2^\omega$ and $t=2^\tau$, then the memory requirements for representing a compact TLWE ciphertext $\check{c}$ drops to $(n+1)\tau$ bits-versus $(n+1)\omega$ bits for the usual representation $\bar{c}$. The impact of $\tau$ on the error can be estimated as follows. For a ciphertext $\bar{c} = (\bar{a}_1, \ldots, \bar{a}_n, \bar{b}) \in (\mathbb{Z}/q\mathbb{Z})^{n+1}$ encrypting plaintext representative $\bar{\mu} \in \mathbb{Z}/q\mathbb{Z}$ under key $s = (s_1, \ldots, s_n) \in \mathbb{B}^n$, the definition of the phase function naturally extends to $$\varphi_s: \mathbb{Z}/q\mathbb{Z} \to \hat{\mathbb{T}}, \bar{c} \mapsto \varphi_s(\bar{c}) = \frac{\mathrm{lift}\left(\bar{b} - \sum_{j=1}^n s_j \bar{a}_j\right)}{q} \pmod{1}.$$

The companion error function is defined as $$Err(\bar{c}) = \varphi_s(\bar{c}) - \frac{\mathrm{lift}(\bar{\mu})}{q} \pmod{1}.$$

For a random variable $x$, $\mathrm{Var}(x)$ denotes its variance. The next bound quantifies the error that is introduced from converting $\bar{c}$ into $\check{c}$, and can be proven mathematically. The inventors have found the variance of the error Err can be expressed in terms of the variance of the unclipped encrypted data item. For example, it holds that that if $\mathrm{Var}(Err(\bar{c})) = \sigma^2$ then $$\mathrm{Var}\left(Err(\check{c})\right) \leq \sigma^2 + \frac{n+2}{6q^2} \left\lceil \frac{q}{2t} \right\rfloor \left(\left\lceil \frac{q}{2t} \right\rfloor + 1\right).$$

In other words, the variance may increase due to the clipping, but the increment is bounded, with a bound that depends only on $n$, $q$, and $t$. The above bound can be established mathematically, but can also be verified empirically.

For example, for $q=2^\omega$ with $\omega=32$ and the recommended set of parameters (n=630 and $\sigma=2^{-15}$), one has for example $$\frac{n+2}{6q^2} \left\lceil \frac{q}{2t} \right\rfloor \left(\left\lceil \frac{q}{2t} \right\rfloor + 1\right) < 2^{-27.28}$$

for $t=2^{16}$ and $$\frac{n+4}{16}\left(\frac{q+t}{qt}\right)^2 < 2^{-29.28}$$

for $t=2^{17}$. Letting $t=2^\tau$, this leads to $\check{\sigma}<2^{-13}$ for $\tau=16$ and $\check{\sigma}<2^{-14}$ for $\tau\geq17$. The corresponding ciphertext sizes and reduction factors are given below in Table 1.

It is possible to increase the size reduction without decreasing the security level. The above bound teaches that the standard deviation $\check{\sigma}$ satisfies $$\check{\sigma} \leq \sqrt{\sigma^2 + \frac{n+2}{6q^2}\left\lceil\frac{q}{2t}\right\rceil\left(\left\lfloor\frac{q}{2t}\right\rfloor+1\right)}.$$

The bound comprises two terms, $\sigma^2$ and $$\frac{n+2}{6q^2}\left\lceil\frac{q}{2t}\right\rceil\left(\left\lfloor\frac{q}{2t}\right\rfloor+1\right),$$

and is optimal when both terms have similar values. One can obtain various values in an automated manner, e.g., using an LWE-estimator script (e.g., https://bitbucket.org/malb/lwe-estimator/) that estimates the running time of solving LWE instances of particular parameter values. Using such a script produced the values listed in Table 1. With two more bits for $\check{\sigma}$ ($\check{\sigma}=2^{-13}$), the reduction factor rises from 200% to 222%, and with one more bit for $\check{\sigma}$ ($\check{\sigma}=2^{-14}$), it rises from 188% to 196%. It is even possible to tweak the security parameters so that the value of $\check{\sigma}$ remains the same as in the original setting ($\check{\sigma}=2^{-15}$), which results in a reduction factor of 174%.

TABLE 1

Ciphertext size and reduction factor for various values for (n, σ, t = $2^\tau$) on a 32-bit implementation that about the same security level.

| n | σ | τ | $\check{\sigma}$ | ciphertext size (in bits) | reduction factor |
|---|---|---|---|---|---|
| 630 | $2^{-15}$ | — | — | 20192 | — |
| 630 | $2^{-15}$ | 16 | $2^{-13}$ | 10096 | 200% |
| 630 | $2^{-15}$ | 17 | $2^{-14}$ | 10727 | 188% |
| 567 | $2^{-13.35}$ | 16 | $2^{-13}$ | 9088 | 222% |
| 606 | $2^{-14.37}$ | 17 | $2^{-14}$ | 10319 | 196% |
| 644 | $2^{-15.4}$ | 18 | $2^{-15}$ | 11610 | 174% |

Note that a reduction factor of about 200% can be achieved, with only a modest increase in noise.

Although the above embodiments are detailed for TLWE ciphertexts, the proposed ciphertext encodings readily adapt to the polynomial setting; namely, to TRLWE ciphertexts. The same holds true for TGSW ciphertexts (resp. TRGSW ciphertexts) as they are made of TLWE ciphertexts (resp. TRLWE ciphertexts. See, e.g., the paper "Faster Bootstrapping with Polynomial Error" by Jacob Alperin-Sheriff and Chris Peikert (Advances in Cryptology—CRYPTO 2014, Part I, volume 8616 of Lecture Notes in Computer Science, pages 297-314. Springer, 2014). See also (Chillotti et al. 2020). Likewise, the proposed ciphertext encodings readily extend to the public-key variants of the aforementioned encryption schemes; in particular, using the generic conversion from (Rothblum 2011).

The proposed ciphertext encodings can be applied when it is known in advance that the maximum level of noise that can be tolerated won't be reached—for example, prior to a bootstrapping. In this case, the ciphertexts can be reduced, resulting in memory savings and reduced latency times.

Another useful application resides in the ability to reduce the size of the input ciphertexts beyond the maximum theoretical values given by the LWE estimator and without compromising the security. For example, the choice of $q=2^{16}$ imposes that $\sigma>>2^{-16}$ for security reasons or, conversely, a value of $\sigma=2^{-16}$ imposes $q>>2^{16}$. So, the typical parameter set $(n,\sigma)=(630,2^{-15})$ in the original scheme is not compatible with $q=2^{16}$ at the 128-bit security level. But there is no security degradation in selecting $t=2^{16}$ with the proposed methods together with $(n,\sigma)=(630,2^{-15})$. In all cases, the ciphertexts can be reduced in size.

FIG. 5a schematically shows an example of an embodiment of a method 500 for performing a computation using FHE. The computation comprises a set of FHE operations that implement the computation. An FHE operation operates on an encrypted data item, possibly multiple encrypted data items, possibly also on one or more plain data items. An encrypted data item has an associated noise level. After an encrypted data item has just been encrypted—the encrypted data item is fresh—the noise is comparatively low, but as FHE operations are performed noise increases. Bootstrap operations possibly combined with other useful work, e.g., an activation function, a polynomial evaluation, a squaring, etc., may however restore noise to predetermined levels.

The method comprises receiving (510) one or more encrypted data items for the computation from a data-provider system, the one or more encrypted data items being encrypted with an encryption key of the data-provider system; there may be multiple data-providers.

performing (520) the set of FHE operations on encrypted data items including the received encrypted data items; for example the FHE operations may be combined in a script, a circuit, a sequence or the like.

clipping (530) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

Interestingly, clipping increases noise on purpose, while usually in an FHE implementation one strives to keep noise a low as possible, so that the number of bootstrapping operations can be reduced or avoided altogether. The inventor realized that a clipping operation also provides important benefits, e.g., reducing latency in a transmission, reducing storage space, reducing circuit size, and so on. Although a clipping operation increases noise, if a bootstrap operation were to be performed soon in any case, then even this downside is irrelevant as the bootstrapping operation will restore the noise level.

FIG. 5b schematically shows an example of an embodiment of a method 550 for configuring a set of FHE operations implementing a computation. In practice, one may first provide a computation in the form of cooperating FHE operations, without having the clipping operations in place. The computation may be provided, e.g., by a compiler that takes as input a technical description of the computation, e.g., in a technical language, e.g., in a high-level computer language, e.g., Python, C, etc., in a high-level mathematical computer language, e.g., MATLAB, Mathematica, etc. The compiler may be configured to generate the FHE operations.

For example, the compiler may be configured to parse the input description and map computation elements in the parsed description to one or more FHE operations. The compiler could also include method 550. Method 550 could also be implemented as a separate product, e.g., device, that operates on FHE operations provided to it.

The FHE operations may also be provided by a third-party, for example, by the data-provider, or by a computation provider. The data-provider, or computation provider, etc., may themselves use a compiler as above. The output may be configured by a system implementing method 550. For example, an FHE system, e.g., like system 110, 200 and so on, may configure the computation before or during executing it, so as to make it more efficient. For example, the FHE system could do this itself, e.g., as part of method 500, or could out-source it to another system, e.g., in the cloud. Method 500 comprises

- obtaining (555) the set of FHE operations,
- selecting (560) in the set of FHE operations an operation or selecting a decryption operation,
- selecting (570) an encrypted data item in the selected operation's input and/or an encrypted data item from which the selected operation's input is derived,
- determining (575) an allowable noise level for the encrypted data item from one or more of a noise level of the encrypted data item, a noise tolerance of a bootstrap operation, and/or an operation depending on the encrypted data item,
- deriving (580) a clipping operation from the allowable noise level and insert the clipping operation in the set of FHE operations to clip the encrypted data item.

For example, the noise may be estimated using the bounds provided herein, or as known in the art, e.g., in the provided references. Note that different bounds may be used, e.g., less accurate but quicker, or more accurate while taking in more information about the operation, different bounds for different FHE schemes and so on.

For example, one case where noise can be particularly well estimated is right after a bootstrap operation. For example, one way to perform high-clipping, may be to perform a bootstrap operation, a clipping operation, a send operation, and another bootstrap. In this case, clipping can remove many bits, as the noise level is low after first bootstrap, while the clipping is immediately followed by a second bootstrap.

FIG. 5c schematically shows an example of an embodiment of a method 600 for reducing the size of encrypted data items for use in a computation using fully homomorphic encryption (FHE) cryptography. An application of FHE operations is to store data received from another party, e.g., a data provider, so that later computations may be computed on it. For example, a data-provider may provide genomic information at a first time, e.g., time point or time moment, store the received information and later perform a computation at a second time. For example, the data received at the first time may be encrypted; at the second time a further encrypted data item is received and which is combined with the stored information in a computation. For example, at the second time a further genomic information may be provided, which is to be matched against the genomic information provided at the first time point.

The received encrypted data item may be quite large, and may take up a lot of storage. One way to resolve this is to clip encrypted data items before storage, e.g., as they are received, or after their computation. But this is not always feasible, for example, encrypted data items may be received and stored by a third party who is not capable of handling them, for example, the encrypted data items may be stored at a time when future noise requirements were unknown, etc. There is thus a need for a data-size reduction system that can reduce the size of encrypted data items that are already in storage.

Method (600) is configured for reducing the size of encrypted data items that may already be in storage, and which will later be used in a computation using fully homomorphic encryption (FHE) cryptography. Method 600 comprises

- obtaining (610) one or more encrypted data items for the computation, the one or more encrypted data items being encrypted with an encryption key,
- clipping (620) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

Methods 500, 550 and 600 may be computer implemented. For example, the methods, the computer may access data such as training data, or data for computation or data for evaluation, e.g., one or more images, sensor data, e.g., data representing the technical state of a device, e.g., machine, plant or the like. Receiving input data may be done using a communication interface, e.g., an electronic interface, a network interface, a memory interface, etc. For example, storing or retrieving parameters may be done from an electronic storage, e.g., a memory, a hard drive, etc., e.g., parameters of FHE operation, neural network weights, etc. For example, applying a neural network to data of the training data, and/or adjusting the stored parameters to train the network may be done using an electronic computing device, e.g., a computer.

An embodiment of a neural network, either during training and/or during applying may have multiple layers, which may include, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500, 550 and 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 6A:
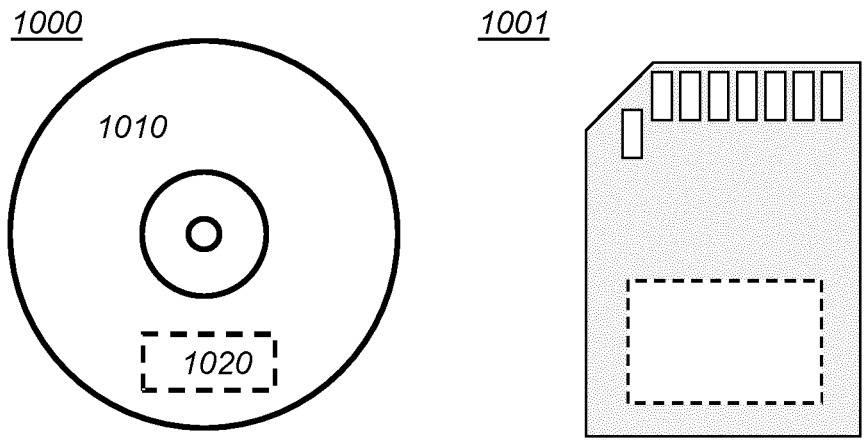

FIG. 6a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform a method according to an embodiment, e.g., a computation, configuration or data-reduction method. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method.

Figure 6B:
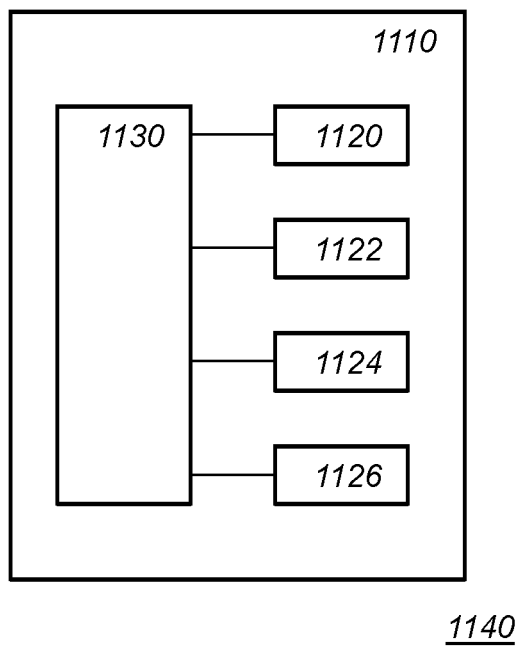

FIG. 6b shows in a schematic representation of a processor system 1140 according to an embodiment, e.g., a system for computation, and/or configuration, and/or data-size reduction. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

Further, memory and storage may both be considered to be "non-transitory machine-readable media." As used herein, the term "non-transitory" will be understood to exclude transitory signals but to include all forms of storage, including both volatile and non-volatile memories.

While device 1140 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

The following clauses represent aspects of the invention that are contemplated and that may be claimed, possibly in combination with further elements as supported herein.

1. A method (500) for performing a computation using fully homomorphic encryption (FHE) cryptography, the computation comprising a set of FHE operations implementing the computation and operating on encrypted data items, an encrypted data item having an associated noise level, the method comprising
   receiving (510) one or more encrypted data items for the computation from a data-provider system, the one or more encrypted data items being encrypted with an encryption key of the data-provider system,
   performing (520) the set of FHE operations on encrypted data items including the received encrypted data items,
   clipping (530) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

2. A method for performing a computation as in Clause 1, wherein the set of FHE operations comprises one or more bootstrap operations, a bootstrap operation acting on one or more encrypted data items in a bootstrap input and generating one or more encrypted data items in a bootstrap output, the bootstrap input comprising the clipped encrypted data item and/or an encrypted data item derived from the clipped encrypted data item, a noise level associated with the bootstrap input being below a noise tolerance of the bootstrap operation.

3. A method for performing a computation as in any one of the preceding clauses, wherein
   an encrypted data item comprises a tuple of numbers and/or polynomials, the tuple representing a plain data item and noise, clipping being applied to one or more of the numbers and/or coefficients of the polynomials.

4. A method for performing a computation as in any one of the preceding clauses, wherein clipping an encrypted data item comprises discarding one or more digits and rounding the remaining digits, e.g., by one of reducing the resolution of one or more numbers comprised in the encrypted data item.

5. A method for performing a computation as in any one of the preceding clauses, comprising
   storing the clipped encrypted data item for later FHE processing, and/or
   transmitting the clipped encrypted data item for further FHE processing on a further device, and/or
   performing the computation at least partly in parallel on at least a first device and a second device, the first and second device cooperating by sending and/or receiving encrypted data items clipped at least in part.

6. A method for performing a computation as in any one of the preceding clauses, wherein the set of FHE operations comprises multiple bootstrapping operations, at least two of which are configured for a bootstrap input having a different number of bits.

7. A method for performing a computation as in any one of the preceding clauses, comprising
   determining an allowable noise level for the encrypted data item form one or more of a noise level of the encrypted data item, a noise tolerance of a subsequent bootstrap operation, and/or an operation depending on the encrypted data item,
   clipping the encrypted data item, the increased associated noise level of the encrypted data item being below the allowable noise.

8. A method for performing a computation as in Clause 6, wherein the determining is performed after receiving the one or more encrypted data item from the data-provider system.

9. A method for performing a computation as in any one of the preceding clauses, wherein the noise may be represented by a parameter of a probability distribution.

10. A method for performing a computation as in any one of the preceding clauses, wherein the computation comprises evaluation of a neural network.

11. A method for performing a computation as in any one of the preceding clauses, wherein the encrypted data items represent an image, each pixel of the image corresponding to one or more encrypted data items.

12. A method for performing a computation as in any one of the preceding clauses, wherein the computation is performed at least partly in parallel on at least a first device and a second device, the first device and second device evaluating different neural network nodes the neural network, clipping being applied to encrypted data items representing node inputs, node outputs and/or intermediate node computations, the method comprising sending the clipped encrypted data items from the first device to the second device.

13. A method for performing a computation as in any one of the preceding clauses, wherein a bootstrap operation combines a bootstrap and a neural network activation function.

14. A method (550) for configuring a set of FHE operations implementing a computation and operating on encrypted data items, an encrypted data item having an associated noise level, the method comprising
   obtaining (555) the set of FHE operations,
   selecting (560) in the set of FHE operations an operation or selecting a decryption operation,
   selecting (570) an encrypted data item in the selected operation's input and/or an encrypted data item from which the selected operation's input is derived,
   determining (575) an allowable noise level for the encrypted data item from one or more of a noise level of the encrypted data item, a noise tolerance of a bootstrap operation, and/or an operation depending on the encrypted data item,
   deriving (580) a clipping operation from the allowable noise level and insert the clipping operation in the set of FHE operations to clip the encrypted data item.

15. A method (600) for reducing the size of encrypted data items for use in a computation using fully homomorphic encryption (FHE) cryptography, the computation comprising a set of FHE operations implementing the computation operating on encrypted data items, an encrypted data item having an associated noise level, the method comprising
   obtaining (610) one or more encrypted data items for the computation, the one or more encrypted data items being encrypted with an encryption key,
   clipping (620) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

16. System for performing a computation using fully homomorphic encryption (FHE) cryptography, the computation comprising a set of FHE operations implementing the computation and operating on encrypted data items, an encrypted data item having an associated noise level, the system comprising
   an interface configured for receiving one or more encrypted data items for the computation from a data-provider system, the one or more encrypted data items being encrypted with an encryption key of the data-provider system, and
   a processor system configured for
      performing (520) the set of FHE operations on encrypted data items including the received encrypted data items, and
      clipping (530) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

17. System for configuring a set of FHE operations implementing a computation and operating on encrypted data items, an encrypted data item having an associated noise level, the system comprising
   an interface configured for obtaining (555) the set of FHE operations, and
   a processor system configured for
      selecting in the set of FHE operations an operation or selecting a decryption operation,
      selecting an encrypted data item in the selected operation's input and/or an encrypted data item from which the selected operation's input is derived,
      determining an allowable noise level for the encrypted data item from one or more of a noise level of the encrypted data item, a noise tolerance of a bootstrap operation, and/or an operation depending on the encrypted data item, and deriving a clipping operation from the allowable noise level and insert the clipping operation in the set of FHE operations to clip the encrypted data item.

18. System for reducing the size of encrypted data items for use in a computation using fully homomorphic encryption (FHE) cryptography, the computation comprising a set of FHE operations implementing the computation operating on encrypted data items, an encrypted data item having an associated noise level, the system comprising an interface configured for obtaining one or more encrypted data items for the computation, the one or more encrypted data items being encrypted with an encryption key, and a processor system configured for clipping (620) an encrypted data item, thereby reducing a bit-size of the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

19. A transitory or non-transitory computer readable medium (1000) comprising data (1020), wherein the data indicates one or more of the following:

instructions, which when executed by a processor system, cause the processor system to perform a method according to any one of clauses 1-15, a set of FHE operations implementing a computation, the set comprising one or more clipping operations and configured according to clause 14.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A method for performing a computation using fully homomorphic encryption (FHE) cryptography, the computation comprising a set of FHE operations implementing the computation and operating on encrypted data items, an encrypted data item having an associated noise level, the method comprising:

(a) receiving one or more encrypted data items for the computation from a data-provider system, the one or more encrypted data items being encrypted with an encryption key of the data-provider system, (b) performing the set of FHE operations on encrypted data items including the received encrypted data items, (c) clipping an encrypted data item, thereby reducing a bit-size of one or more numbers representing the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation, and (d) storing the clipped encrypted data item for later FHE processing, and/or transmitting the clipped encrypted data item for further FHE processing on a further device.

2. The method for performing a computation as in claim 1, wherein the set of FHE operations comprises one or more bootstrap operations, a bootstrap operation acting on one or more encrypted data items in a bootstrap input and generating one or more encrypted data items in a bootstrap output, the bootstrap input comprising the clipped encrypted data item and/or an encrypted data item derived from the clipped encrypted data item, a noise level associated with the bootstrap input being below a noise tolerance of the bootstrap operation.

3. The method for performing a computation as in claim 1, wherein an encrypted data item comprises a tuple of numbers and/or polynomials, the tuple representing a plain data item and noise, clipping being applied to one or more of the numbers and/or coefficients of the polynomials.

4. The method for performing a computation as in claim 1, wherein clipping an encrypted data item comprises discarding one or more digits and rounding the remaining digits by one of reducing the resolution of one or more numbers comprised in the encrypted data item.

5. The method for performing a computation as in claim 1, further comprising:

(e) performing the computation at least partly in parallel on at least a first device and a second device, the first and second device cooperating by sending and/or receiving encrypted data items clipped at least in part.

6. The method for performing a computation as in claim 1, wherein the set of FHE operations comprises multiple bootstrapping operations, at least two of which are configured for a bootstrap input having a different number of bits.

7. The method for performing a computation as in claim 1, further comprising:

(e) determining an allowable noise level for the encrypted data item form one or more of a noise level of the encrypted data item, a noise tolerance of a subsequent bootstrap operation, and/or an operation depending on the encrypted data item, and (f) clipping the encrypted data item, the increased associated noise level of the encrypted data item being below the allowable noise.

8. The method for performing a computation as in claim 6, wherein the determining is performed after receiving the one or more encrypted data item from the data-provider system.

9. The method for performing a computation as in claim 1, wherein the noise may be represented by a parameter of a probability distribution.

10. The method for performing a computation as in claim 1, wherein the computation comprises evaluation of a neural network.

11. The method for performing a computation as in claim 1, wherein the encrypted data items represent an image, each pixel of the image corresponding to one or more encrypted data items.

12. The method for performing a computation as in claim 1, wherein the computation is performed at least partly in parallel on at least a first device and a second device, the first device and second device evaluating different neural network nodes the neural network, clipping being applied to encrypted data items representing node inputs, node outputs and/or intermediate node computations, the method comprising sending the clipped encrypted data items from the first device to the second device.

13. The method for performing a computation as in claim 1, wherein a bootstrap operation combines a bootstrap and a neural network activation function.

14. The method for performing a computation as in claim 1, wherein the clipping reduces the resolution of one or more numbers representing the encrypted data item.

15. The method for performing a computation as in claim 1, wherein said clipping (c) comprises:
   (c1) discarding one or more digits from one or more numbers representing the encrypted data, and/or
   (c2) rounding one or more numbers representing the encrypted data, and/or
   (c3) scaling towards a smaller range of numbers, said scaling being optionally followed by a rounding, floor or ceiling operation, and/or
   wherein said clipping comprises:
   (c4) applying a clipping function to one or more numbers representing the encrypted data, wherein the clipping function may be defined by $\lceil \text{lift}(x)t/q \rfloor$ for a number $x$ in $\mathbb{Z}/q\mathbb{Z}$ and a parameter $0<t<q$.

16. The method for performing a computation as in claim 1, wherein said clipping (c) comprises applying a clipping operation to one or more or all numbers representing the encrypted data item thus obtaining the clipped encrypted data item, the clipping operation reducing a bit-size of the clipped number thus increasing an associated noise level of the encrypted data item.

17. A method for configuring a set of FHE operations implementing a computation and operating on encrypted data items, an encrypted data item having an associated noise level, the method comprising:
   (i) obtaining the set of FHE operations,
   (ii) selecting in the set of FHE operations an operation or selecting a decryption operation,
   (iii) selecting an encrypted data item in the selected operation's input and/or an encrypted data item from which the selected operation's input is derived,
   (iv) determining an allowable noise level for the encrypted data item from one or more of a noise level of the encrypted data item, a noise tolerance of a bootstrap operation, and/or an operation depending on the encrypted data item, and
   (v) deriving a clipping operation from the allowable noise level and insert the clipping operation in the set of FHE operations to clip the encrypted data item.

18. A method for reducing the size of encrypted data items for use in a computation using fully homomorphic encryption (FHE) cryptography, the computation comprising a set of FHE operations implementing the computation operating on encrypted data items, an encrypted data item having an associated noise level, the method comprising:
   (i) obtaining one or more encrypted data items for the computation, the one or more encrypted data items being encrypted with an encryption key, and
   (ii) clipping an encrypted data item, thereby reducing a bit-size of one or more numbers representing the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

19. A system for performing a computation using fully homomorphic encryption (FHE) cryptography, the computation comprising a set of FHE operations implementing the computation and operating on encrypted data items, an encrypted data item having an associated noise level, the system comprising:
   an interface configured for receiving one or more encrypted data items for the computation from a data-provider system, the one or more encrypted data items being encrypted with an encryption key of the data-provider system, and
   a processor system configured for:
     (i) performing the set of FHE operations on encrypted data items including the received encrypted data items,
     (ii) clipping an encrypted data item, thereby reducing a bit-size of one or more numbers representing the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation, and
     (iii) storing the clipped encrypted data item for later FHE processing, and/or transmitting the clipped encrypted data item for further FHE processing on a further device.

20. A system for configuring a set of FHE operations implementing a computation and operating on encrypted data items, an encrypted data item having an associated noise level, the system comprising:
   an interface configured for obtaining the set of FHE operations, and
   a processor system configured for:
     (i) selecting in the set of FHE operations an operation or selecting a decryption operation,
     (ii) selecting an encrypted data item in the selected operation's input and/or an encrypted data item from which the selected operation's input is derived,
     (iii) determining an allowable noise level for the encrypted data item from one or more of a noise level of the encrypted data item, a noise tolerance of a bootstrap operation, and/or an operation depending on the encrypted data item, and
     (iv) deriving a clipping operation from the allowable noise level and insert the clipping operation in the set of FHE operations to clip the encrypted data item.

21. A system for reducing the size of encrypted data items for use in a computation using fully homomorphic encryption (FHE) cryptography, the computation comprising a set of FHE operations implementing the computation operating on encrypted data items, an encrypted data item having an associated noise level, the system comprising an interface configured for obtaining one or more encrypted data items for the computation, the one or more encrypted data items being encrypted with an encryption key, and a processor system configured for clipping an encrypted data item, thereby reducing a bit-size of one or more numbers representing the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation.

22. A non-transitory computer readable medium comprising data, wherein the data indicates instructions, which when executed by a processor system, cause the processor system to perform a computation using fully homomorphic encryption (FHE) cryptography, the computation comprising a set of FHE operations implementing the computation and operating on encrypted data items, an encrypted data item having an associated noise level, the instructions, which when executed by a processor system, cause the processor system to perform:

(a) receiving one or more encrypted data items for the computation from a data- provider system, the one or more encrypted data items being encrypted with an encryption key of the data-provider system, (b) performing the set of FHE operations on encrypted data items including the received encrypted data items, (c) clipping an encrypted data item, thereby reducing a bit-size of one or more numbers representing the encrypted data item and increasing an associated noise level of the encrypted data item, wherein an FHE operation or a decrypt operation operates on the clipped encrypted data item as input, a noise level associated with the input being below a noise tolerance of the FHE operation or decrypt operation, and (d) storing the clipped encrypted data item for later FHE processing, and/or transmitting the clipped encrypted data item for further FHE processing on a further device.

23. A non-transitory computer readable medium comprising data, wherein the data indicates a set of FHE operations implementing a computation and operating on encrypted data items, an encrypted data item having an associated noise level, the set comprising one or more clipping operations configured according to the following operations:

(i) obtaining the set of FHE operations, (ii) selecting in the set of FHE operations an operation or selecting a decryption operation, (iii) selecting an encrypted data item in the selected operation's input and/or an encrypted data item from which the selected operation's input is derived, (iv) determining an allowable noise level for the encrypted data item from one or more of a noise level of the encrypted data item, a noise tolerance of a bootstrap operation, and/or an operation depending on the encrypted data item, and (v) deriving a clipping operation from the allowable noise level and insert the clipping operation in the set of FHE operations to clip the encrypted data item.

* * * * *